(12) United States Patent  (10) Patent No.: US 7,421,184 B2
Long  (45) Date of Patent: Sep. 2, 2008

(54) LIGHT PIPE ASSEMBLY FOR USE WITH SMALL FORM FACTOR CONNECTOR

(75) Inventor: Jerry A. Long, Elgin, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/130,666

(22) Filed: May 16, 2005

(65) Prior Publication Data

US 2005/0254257 A1  Nov. 17, 2005

Related U.S. Application Data

(60) Provisional application No. 60/571,375, filed on May 14, 2004, provisional application No. 60/584,420, filed on Jun. 30, 2004, provisional application No. 60/584,421, filed on Jun. 30, 2004.

(51) Int. Cl.
*G02B 6/10* (2006.01)
*H01R 3/00* (2006.01)
*G09F 13/26* (2006.01)
*G02B 6/00* (2006.01)

(52) U.S. Cl. .............. 385/146; 385/147; 439/490; 362/551; 362/576

(58) Field of Classification Search ........... 385/147, 385/146; 439/490; 362/551, 576
See application file for complete search history.

(56) References Cited

U.S. PATENT DOCUMENTS

| 4,887,876 | A |   | 12/1989 | Fricke et al. |        |
|-----------|---|---|---------|---------------|--------|
| 5,327,328 | A | * | 7/1994  | Simms et al. ................. | 362/26 |
| 5,399,105 | A |   | 3/1995  | Kaufman et al. |       |
| 5,876,239 | A | * | 3/1999  | Morin et al. ................ | 439/490 |
| 5,915,993 | A |   | 6/1999  | Belopolsky et al. |   |
| 5,938,324 | A | * | 8/1999  | Salmon et al. .............. | 362/555 |
| 5,951,330 | A |   | 9/1999  | Reichard et al. |       |
| 5,984,731 | A |   | 11/1999 | Laity |               |
| 6,095,851 | A |   | 8/2000  | Laity et al. |         |
| 6,113,422 | A | * | 9/2000  | Somerville et al. .......... | 439/490 |
| 6,116,962 | A |   | 9/2000  | Laity |               |
| 6,174,194 | B1|   | 1/2001  | Bleicher et al. |       |
| 6,183,292 | B1|   | 2/2001  | Chen et al. |          |
| 6,224,417 | B1|   | 5/2001  | Belopolsky et al. |    |

(Continued)

FOREIGN PATENT DOCUMENTS

EP    0 658 953    6/1995

(Continued)

OTHER PUBLICATIONS

"Interconnections", Machine Design, Jun. 1993, pp. 459-478.

(Continued)

*Primary Examiner*—M. R. Connelly-Cushwa
*Assistant Examiner*—Rhonda S Peace
(74) *Attorney, Agent, or Firm*—Thomas D. Paulius

(57) ABSTRACT

A light pipe assembly is provided for use with small form factor style connectors of a dual row, stacked configuration. The assembly includes two pairs of light pipes, each of which is provided with integrated support members. The support members include members that engage opening disposed on the face of the connector, and the pairs of pipes are arranged so that one pair is supported within the other pair of pipes in a nested type of arrangement.

21 Claims, 22 Drawing Sheets

U.S. PATENT DOCUMENTS

| | | | |
|---|---|---|---|
| 6,264,499 B1 | 7/2001 | Costello et al. | |
| 6,283,786 B1 * | 9/2001 | Margulis et al. | 439/488 |
| 6,352,446 B2 * | 3/2002 | Ezawa et al. | 439/490 |
| 6,463,204 B1 * | 10/2002 | Ati | 385/147 |
| 6,962,511 B2 * | 11/2005 | Gutierrez et al. | 439/676 |
| 7,070,446 B2 | 7/2006 | Henry et al. | |
| 2001/0039140 A1 * | 11/2001 | Fasold et al. | 439/490 |
| 2002/0197043 A1 | 12/2002 | Hwang | |
| 2003/0100218 A1 * | 5/2003 | Tsai et al. | 439/490 |
| 2005/0254772 A1 * | 11/2005 | Long et al. | 385/146 |
| 2005/0255726 A1 | 11/2005 | Long | |
| 2006/0003628 A1 | 1/2006 | Long et al. | |
| 2006/0003632 A1 | 1/2006 | Long et al. | |

FOREIGN PATENT DOCUMENTS

| | | |
|---|---|---|
| WO | WO 00/22697 | 4/2000 |
| WO | WO 03/093888 | 11/2003 |

OTHER PUBLICATIONS

International Search Report in International Patent Application No. PCT/US2005/017147, Aug. 19, 2005.

* cited by examiner

FIG.13
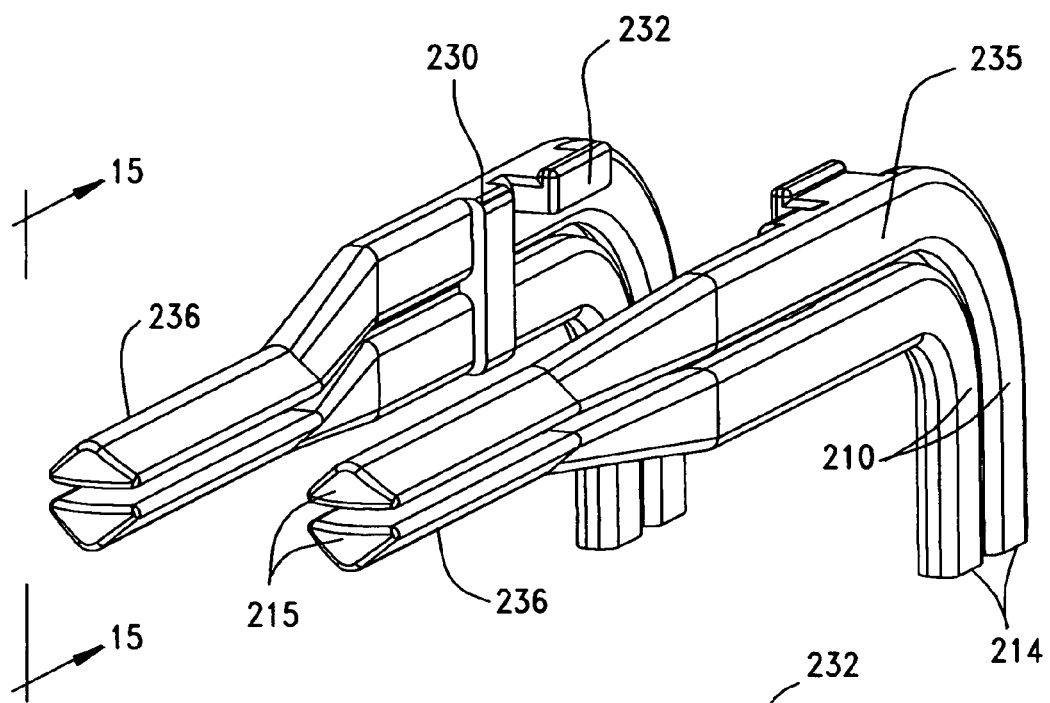
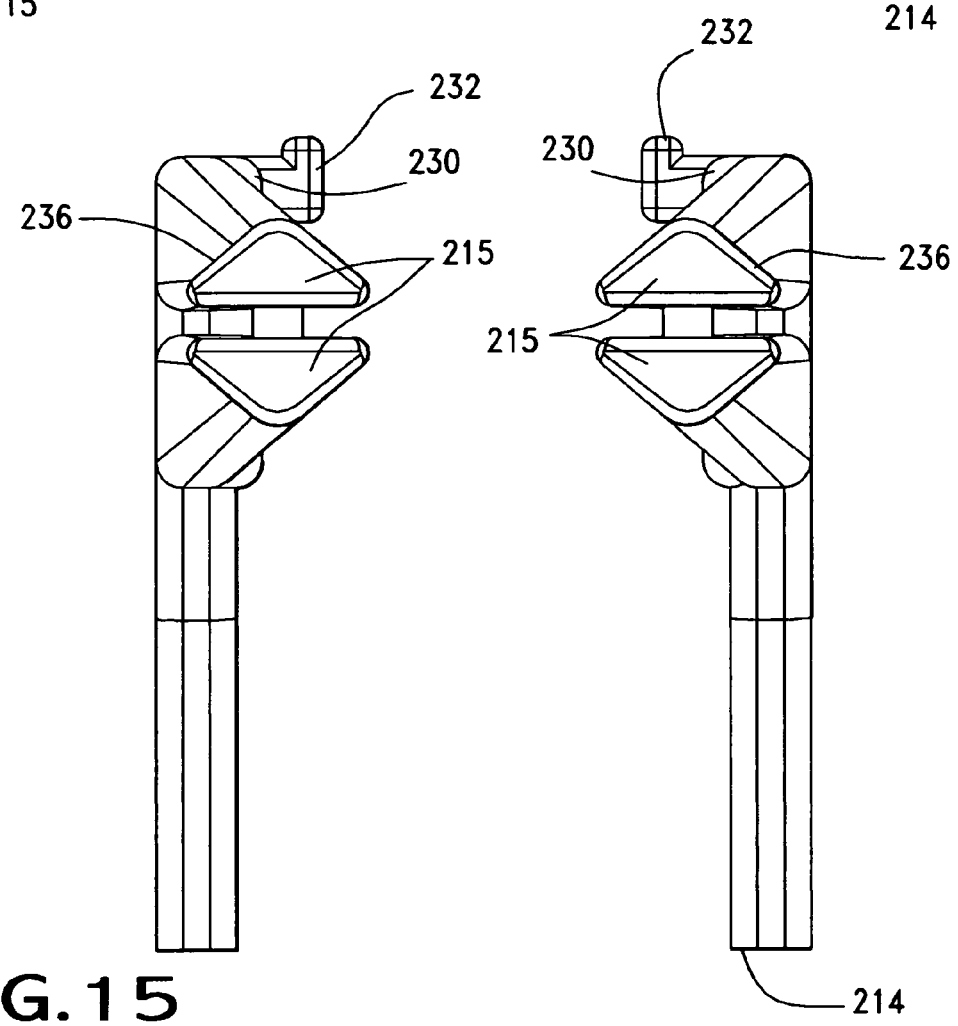
FIG.15

FIG.24A
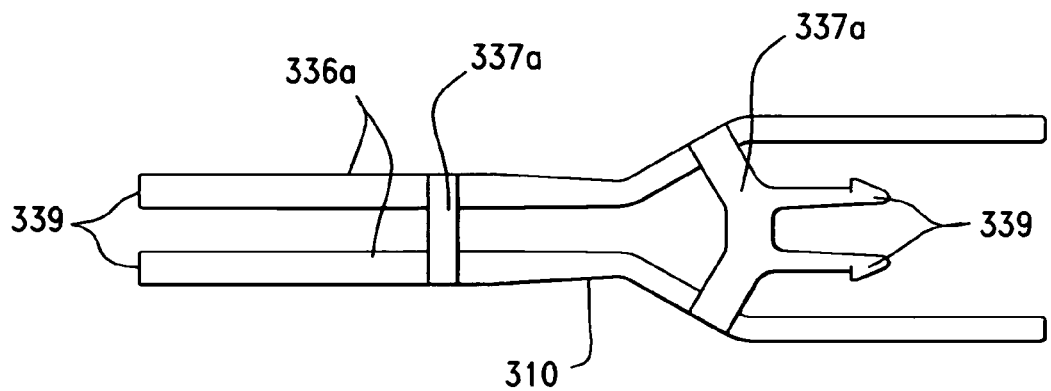
FIG.24B
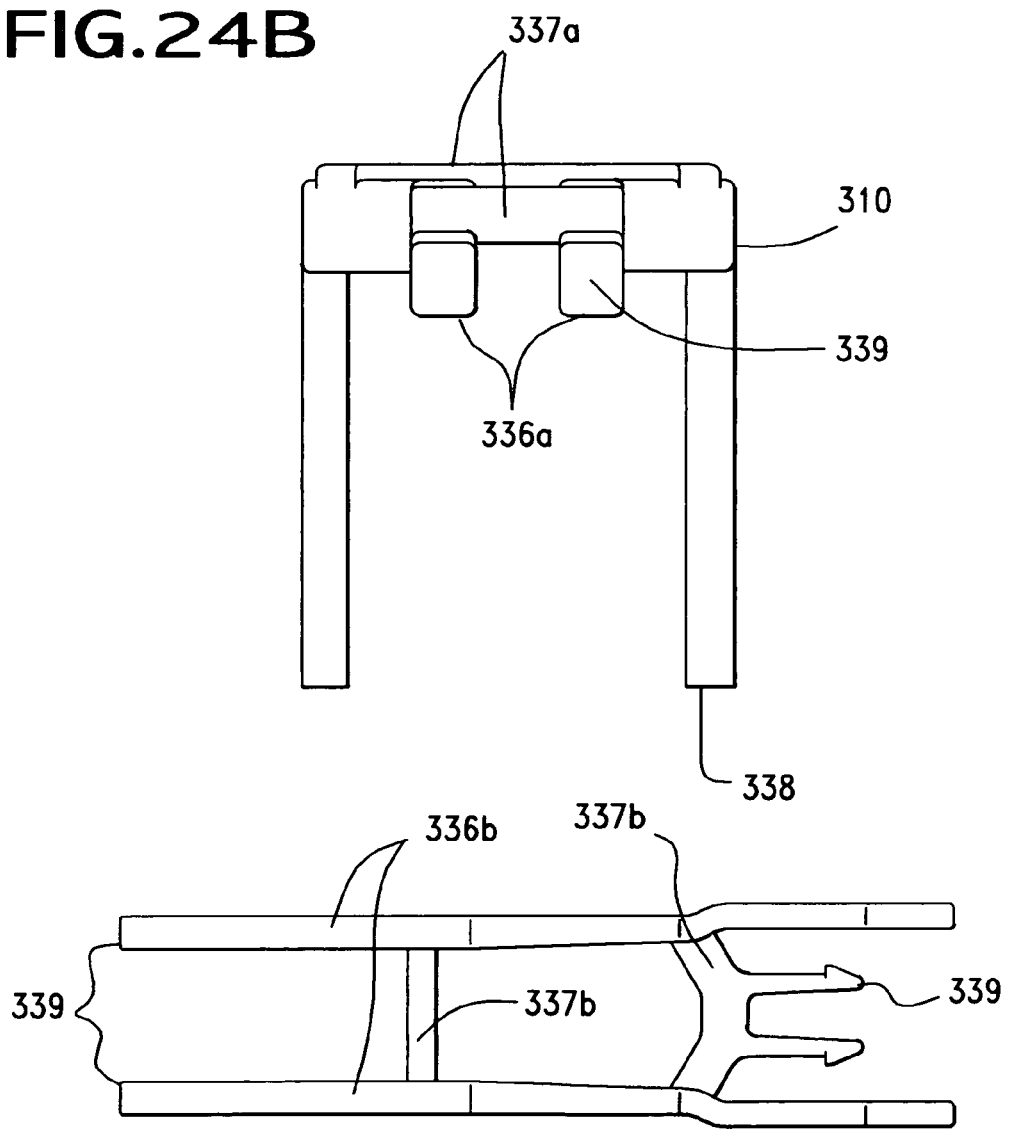
FIG.25A

LIGHT PIPE ASSEMBLY FOR USE WITH SMALL FORM FACTOR CONNECTOR

REFERENCE TO RELATED APPLICATIONS

This application claims priority of prior U.S. Provisional Patent Application Nos. 60/571,375, filed May 14, 2004 and 60/584,420, filed Jun. 30, 2004 and 60/584,421, also filed Jun. 30, 2004.

BACKGROUND OF THE INVENTION

This invention relates to electrical connector assemblies and, more particularly, to an electrical connector assembly that has an indicator light pipe assembly associated therewith.

Electrical connectors adapted for mounting to printed circuit boards are known in the art and are commonly used for connection between two electrical communication devices. In order to ensure that a proper connection has been made and therefore a link is created between the electrical communication devices, indicators may be incorporated into circuits on the printed circuit board. These indicators are typically light emitting diodes (LEDs) which are turned on when a circuit is completed between the mating connectors and the communication devices. Additionally LEDs can be mounted on the printed circuit board to indicate a number of other conditions including the passage of communications signals between the two communication devices, indication of power, or indication that an error in transmitting the signals has occurred.

In an effort to miniaturize printed circuit boards and save board real estate, light pipe assemblies for transmitting light emitted by the LED's have been integrated into connector assemblies. One example of such a connector assembly is disclosed in U.S. Pat. No. 5,876,239 to Morin et al. which teaches a modular jack receptacle connector having a light pipe for transmitting light signals from an input face of the light pipe through an output face of the pipe extending along a mating face of the modular jack receptacle.

A problem arises with these connectors in that the tooling used to produce the connector housing may require modification to enable incorporation of the light pipes into the connector housing. Another problem is that incorporation of the light pipes into the connector assembly tends to increase the footprint of the connector, thereby increasing the printed circuit board "real estate" occupied by the connector.

The present invention is therefore directed to a light pipe assembly that overcomes the aforementioned disadvantages and which fits either alongside a stacked connector assembly or first within the space between two connector engagement areas of a connector component and further extends forwardly from the connector component in a space between two bays associated with the connector component which receive electronic modules therein.

SUMMARY OF THE INVENTION

Accordingly, it is a principal object of the present invention to provide a light transmission assembly that may be used with connectors that are stacked upon each other or which have engagement faces spaced vertically apart.

Another object of the present invention is to provide a light pipe assembly that may be utilized with a dual engagement connector component having two engagement areas vertically spaced apart from each other on the component and which are each surrounded by a metal shield component, the shield component defining two distinct module-receiving bays which are separated by an intervening space, the light pipe assembly extending from the connector component forwardly through the intervening space to provide at least a pair of indicator lights near the front of the module-receiving bays, the light pipe assembly engaging the sides or front of the connector component.

A further object of the present invention is to provide a light pipe assembly of the type described above wherein the assembly includes two pairs of light pipes, each pair extending from the connector component through the intervening space and ends of the light pipes being received within a spacer head that positions the ends of the light pipes proximate to the front of the module receiving bays, both the light pipes and the spacer head being disposed within a space between two module-receiving bays of the overall connector assembly.

Yet a still further object of the present invention is to provide a light pipe assembly of the type described above wherein each pair of light pipes is formed separately and one of the pair of light pipes defines a nest area into which the other pair of light pipes fit, and each of the two pairs of light pipes having means for engaging the front face of an associated connector component.

Still yet a further object of the present invention is to provide a light pipe assembly in which two pairs of light pipes are nested together, the light pipes having first ends that are positioned over illuminating areas on a circuit board and second ends that are disposed along a front face of a shielding enclosure that encloses the light pipes and an associated connector component, the light pipe first ends being held in their position by engagement hooks that extend out from the light pipe pairs and into engagement openings formed in the connector component, the light pipes extend between the first and second ends entirely exterior of the connector component.

The present invention accomplishes these and other object by way of its structure. In one principal aspect of the present invention and as exemplified by a first embodiment of the invention, two pairs of light pipes are provided and each of which acts as an "On" or "Off" indicator light for an electronic module that is engageable with an associated connector component. The light pipes extend between first ends that are aligned with illuminating areas on the circuit board and second ends that are exposed to the exterior of the associated connector component. Each pair of light pipes is stacked above each other and the pair are interconnected by engagement members that engage a shield assembly that encloses the connector component and defines two spaced apart module-receiving bays.

In another embodiment of the present invention, the light pipe pairs are formed with engagement members that engage the sides of the associated connector component, and the second ends of the light pipes extend forwardly of the connector component into an intervening space which is disposed between the two module-receiving bays, the second ends being received with an endcap member that occupies the front area of the intervening space. The endcap is preferably formed from a conductive material in order to provide shielding at the front of the connector assembly.

The light pipes may also be formed in a fashion so that they engage only the front of the associated connector component. Hooks that are integrally formed with the light pipe pairs are the preferable means of attachment for this embodiment of the invention. The two pairs of light pipes are formed in horizontal pairs and one pair is at least partially nested within the other pair. Each such pair utilizes its own set of engagement hooks for engaging the front of the connector component so that the sides of the connector component do not have to be modified to engage the light pipes in any fashion, so as to maintain the reduced size of the connector component.

In another embodiment of the present invention, the light pipes extend up from the circuit board and then turn at angle so they extend lengthwise of the connector component. The light pipes extend horizontally and forwardly past a front mating face of the connector component and the pairs of light pipes are nested within each other. In this fashion, the entire horizontal portion of the light pipes may be maintained in a bay that separates the two module-receiving bays of the connector component.

These and other objects, features and advantages of the present invention will be clearly understood through a consideration of the following detailed description

BRIEF DESCRIPTION OF THE DRAWINGS

The invention will now be described by way of example with reference to the following figures of which:

FIG. 13 is a perspective view of only the two pairs of light pipes of FIG. 12;

FIG. 15 is a frontal elevational view of the light pipes of FIG. 13, taken along line 15-15 thereof;

FIG. 24A is a top plan view of the first, or inner pair of light pipes;

FIG. 24B is a front elevational view of FIG. 24A showing the inner pair of light pipes;

FIG. 25A is a top plan view of the second, or outer, pair of light pipes;

DETAILED DESCRIPTION OF THE INVENTION

Figure 1:
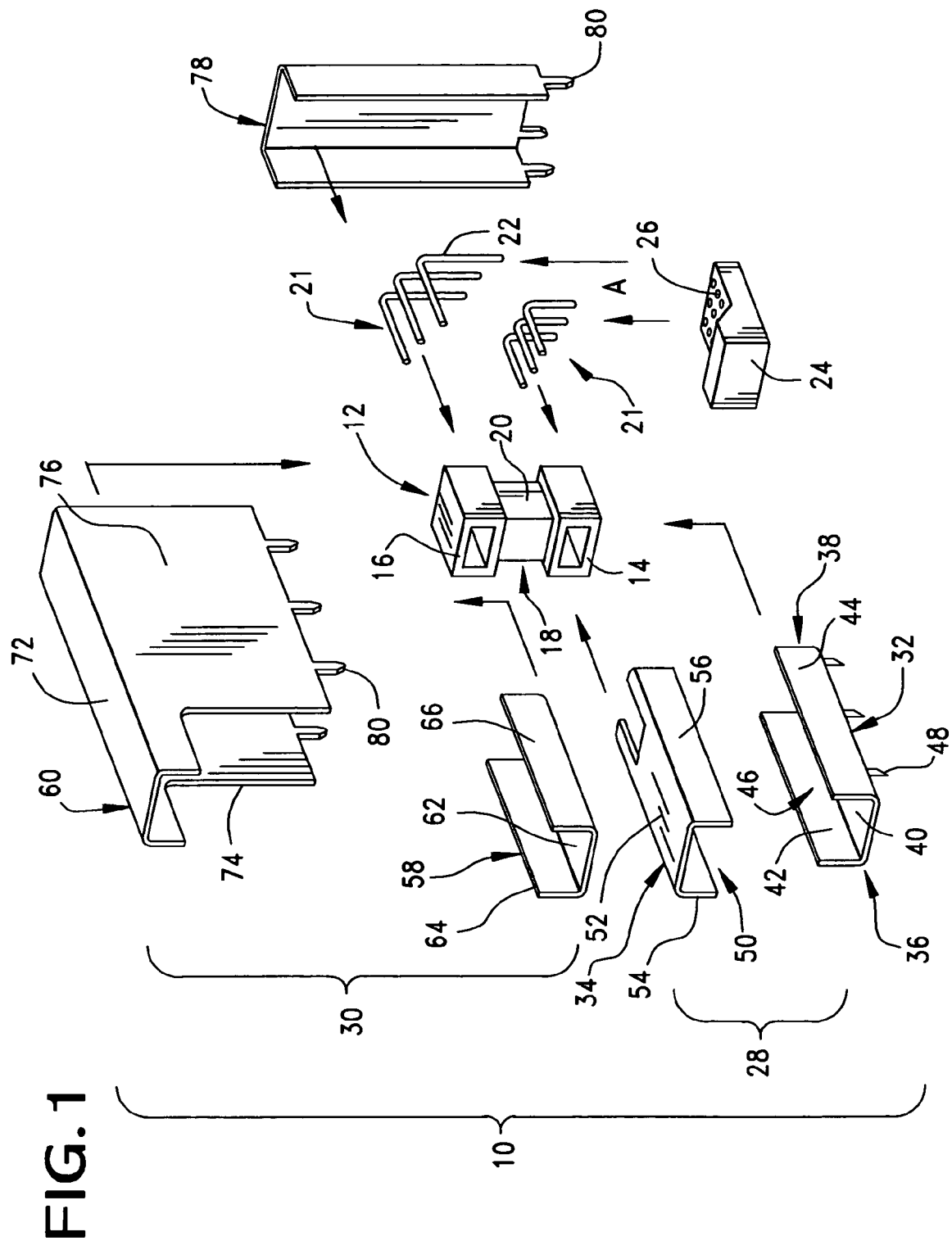
FIG. 1 is an exploded perspective view of a portion of a connector assembly constructed in accordance with the principles of the present invention.
Figure 2:
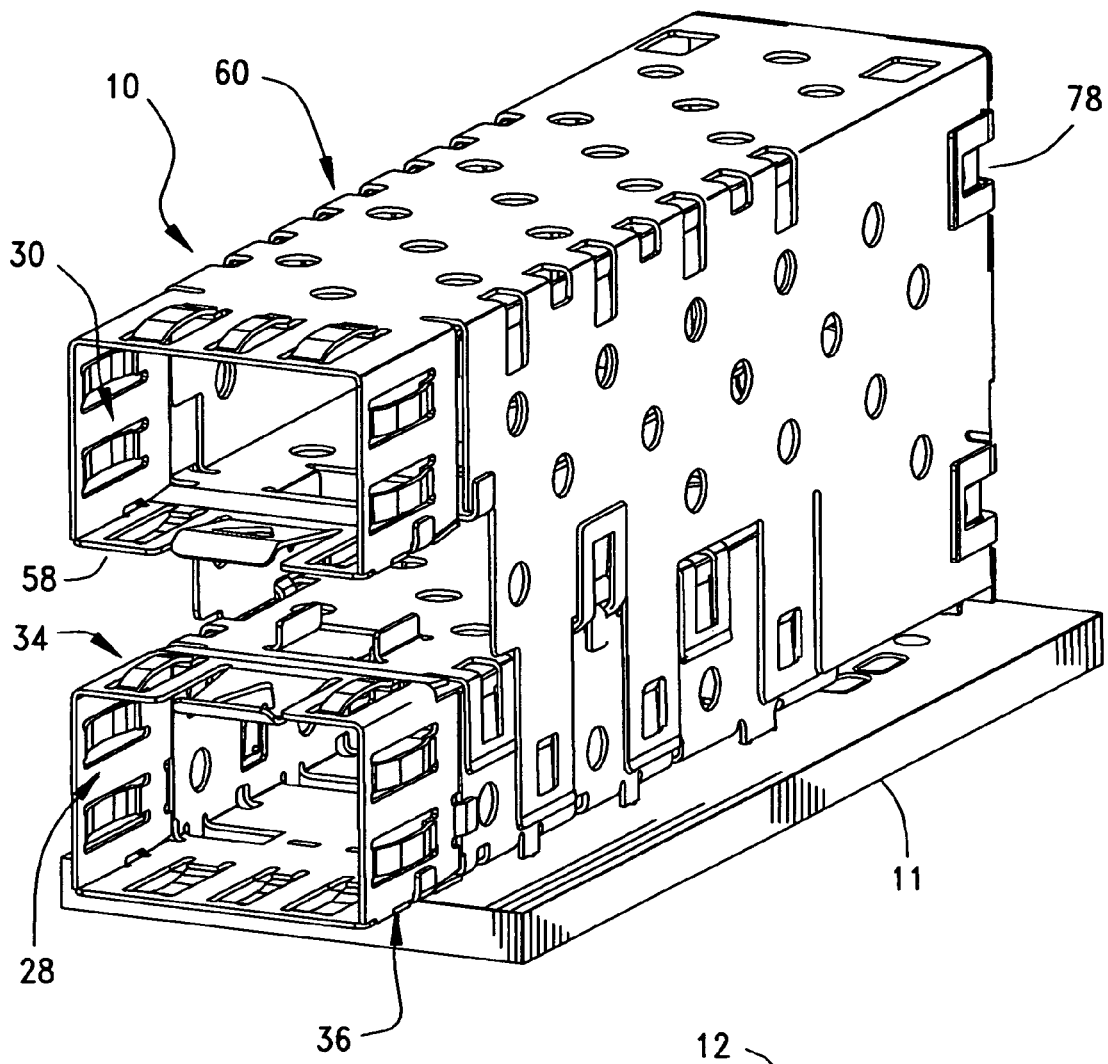
FIG. 2 is a perspective assembled view of the portion of the connector assembly shown in FIG. 1.
Figure 3:
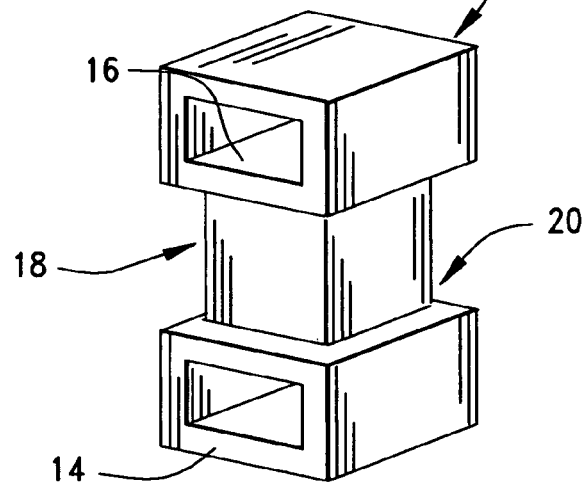
FIG. 3 is a perspective view of a connector housing incorporated into the assembly shown in FIG. 1.

A connector assembly 10 of the present invention will now be described generally with reference to FIGS. 1-3. The connector assembly 10 is designed for mounting on a printed circuit board 11. Connector assembly 10 comprises a connector housing 12 defining a pair of ports 14, 16 each adapted for receiving a portion of a mating connector (not shown). Herein, the housing port 14 will be referred to as the "lower port", and housing port 16 will be referred to as the "upper port", but it will be understood that such terms as "upper", "lower", etc. are used in this description to facilitate an understanding of the invention and are not intended to be limiting.

Upper and lower ports 14, 16 each have a plurality of conductive terminals 21 mounted therein for engaging complementary terminals of a mating connector (not shown). To permit space for latching mechanisms for releasably securing connector assembly 10 in a mated condition with a complementary mating connector, a cavity 18 may be formed between upper port 16 and lower port 14 of connector housing 12. Recesses 20 may be formed in side portions of housing 12, for purposes to be described below. Recesses 14 may be in communication with housing cavity 18.

Connector housing 12 may be molded from an insulative, thermoplastic material. The terminals are mounted in the upper port 16 and the lower port 14 and each terminal has contact portions at an end thereof (not shown) for engaging complementary contact portions of the terminals of the mating connector, and tail portions 22 projecting rearwardly from the contact portions and extending downwardly toward printed circuit board 11 for electrical connection to respective traces thereon via through holes formed in (or surface mount pads formed on a surface of) printed circuit board 11. The terminals may be stamped and formed of sheet metal material.

A tail aligner 24 may be attached to connector housing 12 using any one of a variety of known methods, such as a snap-fit, press-fit or mechanical fasteners. The tail aligner 24 includes a plurality of through holes 26 formed therein and which are configured to match the arrangement of terminal tail portions 22 extending downward toward printed circuit board 11. The tail aligner 24 is mounted onto tail portions 22 of the terminals in the direction of arrow "A" (FIG. 1) and it sits on the surface of the circuit board 11.

A pair of shielding cage assemblies 28, 30 are secured to connector housing 12, with the cage assemblies including a lower cage assembly 28 that is secured to housing 12 to substantially enclose lower port 14 thereof, and an upper cage assembly 30 that is secured to the housing 12 to substantially enclose the upper port 16 thereof. The cage assemblies 28, 30 are typically formed using a material, such as sheet metal or plated plastic, which conducts and guides magnetic and electric field energy so as to aid in shielding circuit elements positioned proximate connector assembly 10 from electromagnetic interference (EMI).

The lower cage assembly 28 typically includes two interengaging pieces, a lower base component 32 and a lower cover component 34. The lower base component 32 has a general U-shaped configuration when viewed from the front or rear ends, 36, 38 respectively. As such, the lower base component 32 typically includes three sides, or walls: a base or bottom wall 40 and two sidewalls 42, 44 that extend upwardly from the bottom wall 40 and which are spaced apart from each other to define a channel 46 therebetween, into which a portion of the connector housing 12 fits. As seen in FIGS. 1 and 2, the front and rear portions of lower base component 32 are left open.

In one embodiment, the lower base component 32 is stamped and formed from sheet metal. The lower base component 32 may alternatively be formed using conductive materials other than metal, such as metal-plated plastic or the like. Lower cover component 34 may also be formed using sheet metal or other conductive materials, such as metal-plated plastic. Generally, the cover component 34 has a length that matches a corresponding length of lower base component 32, and a width that is equal to or slightly greater than a corresponding width of the lower base component 32. The lower cover component 34 is bent, as illustrated, into a general U-shaped configuration when looking at it from its front end 50. In this fashion, it includes top wall 52 and two spaced-apart side walls 54, 56.

Lower base component 32 and lower cover component 34 interengage along respective sidewalls thereof the form an enclosure for at least partially enclosing lower housing Port 14 of connector housing therein. As seen in FIGS. 1 and 2, the front and rear portions of the lower cage assembly 28 are left open. The details of this type of shielding cage structure are provided in U.S. Pat. No. 6,443,768, entitled "Small Form Factor Connector Cage," which issued on Sep. 3, 2002 and is incorporated herein by reference.

The structure of upper cage assembly 30 is substantially similar to that of the lower cage assembly 28. The upper cage assembly 30 typically includes two interengaging pieces, an upper base component 58 and an upper cover component 60. The upper base component 58 has a bottom wall 62 and two spaced-apart sidewalls 64, 66. The upper cover component 60 has a top wall 72 and two spaced apart sidewalls 74, 76. These sidewalls 74 and 76 interengage the upper base componenet as shown in order to form an enclosure similar to that formed by lower cage assembly 28, for at least partially enclosing an upper housing port 16 of the connector housing 12. In addition, sidewalls 74, 76 of upper cover component 60 also extend toward printed circuit board 11 to substantially enclose side portions of both upper cage assembly 30 and lower cage assembly 28. The lower base component 32 may be provided with mounting pin portions 48 that are stamped out of the bottom wall 40 thereof and which are formed, or bent, so that they extend vertically with respect to the lower base bottom wall 40, and generally in the same plane as the sidewalls 42, 44. The mounting pin portions 48 are formed in a desired pattern to engage and mate with corresponding mounting holes on printed circuit board 11. Similar mounting pin portions 80 may be formed to extend along lower edges of extended sidewalls 74, 76 of the cover member 60 to engage mounting holes in printed circuit board 11.

Connector assembly 10 also includes a separate rear wall 78 that is attachable to the upper and lower cage assemblies 28, 30. Rear wall may be formed from the same material as the cage assemblies and forms an enclosure surrounding the terminal tail portions 22, tail aligner 24 and the rear portion of connector housing 12 when attached to cage assemblies 28, 30. The rear wall 78 also includes mounting pin portions 80 that are stamped out of a bottom portion of rear wall 78 and formed, or bent, so that they extend vertically with respect to rear wall 78. The mounting pin portions 80 are formed in a desired pattern to engage and mate with corresponding mounting holes on printed circuit board 11.

Referring to FIGS. 4-7, in another aspect of the present invention, a light pipe assembly, generally designated 82, is incorporated as part of the overall connector assembly 10. The light pipe assembly 82a of FIG. 4 will be referenced for the purpose of describing the basic components of the light pipe assemblies. However, it will be understood that light pipe assembly 82b of FIG. 5 has the same basic features as light pipe assembly 82a.

Figure 4:
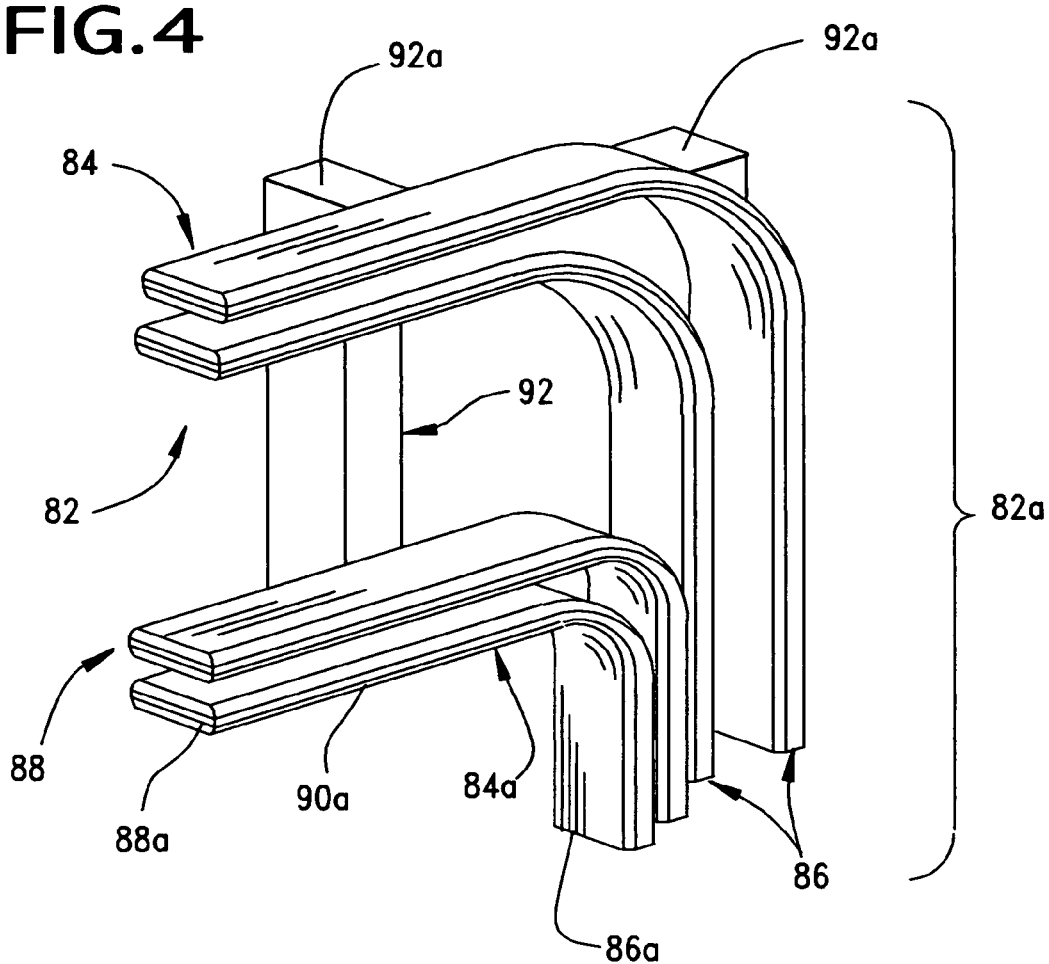
FIG. 4 is perspective view of a first embodiment of a light pipe assembly that may be used with the connector assembly of FIGS. 1-3.
Figure 5:
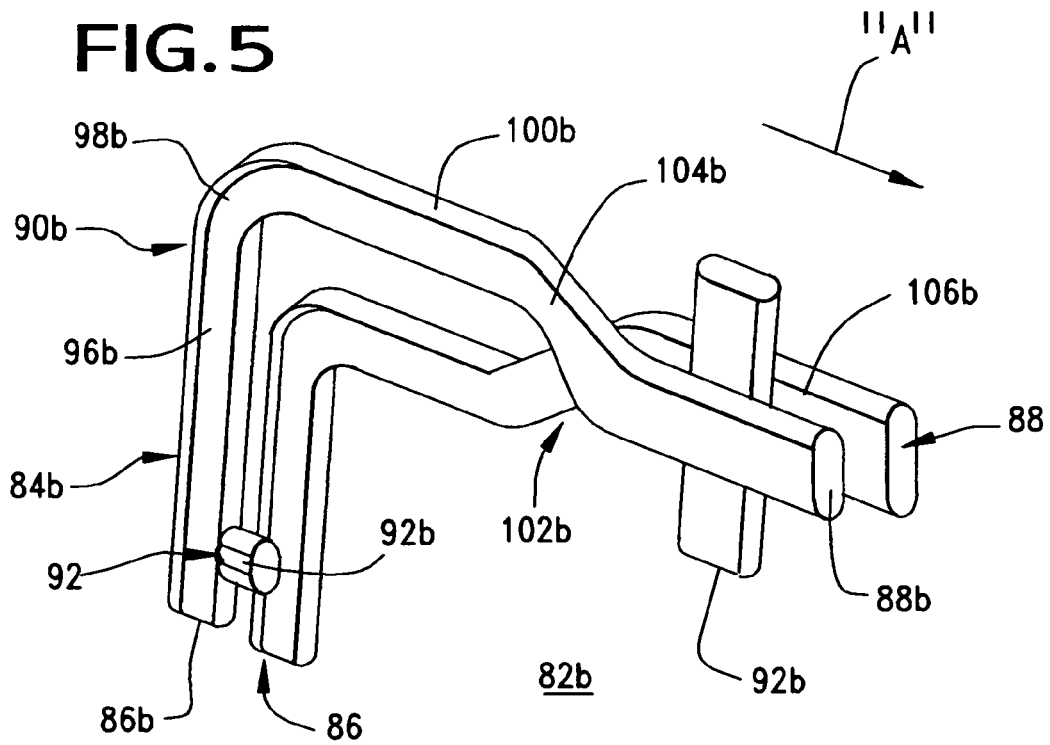
FIG. 5 is perspective view of a second embodiment of a light pipe assembly incorporated into the connector assembly of the present invention.

Light pipe assembly 82 includes at least one light pipe 84 manufactured from a translucent material suitable for carrying light, for example a plastic or glass. The pipes 84 are illustrated as arranged together in pairs of pipes, with each pair shown extending alongside the shielding cage assembly of the connector assembly. FIGS. 4 & 5 show assemblies which are formed using multiple light pipes. Any one of the light pipes 84 may be color-coded, if desired, in order to distinguish it from other light pipes incorporated into the connector assembly. Each light pipe 84 has a light-receiving input face 86, a light emitting output face 88, and a body portion 90 extending between the input and output faces. Light pipes 84 are shaped to carry light signals from input faces 86 through body portions 90 to output faces 88.

Portions of light pipes 84 may be affixed to one or more support members 92. Support members 92 provide a framework for positioning and securing light pipes 84 with respect to each other and with respect to cage assemblies 28, 30. Thus, portions of support members 92 may be formed so as to enable engagement with features on one of cage assemblies 28, 30. Support members 92 may be formed integral with light pipes 84 as shown in the Figures or they may be separate members that are attached to the light pipes in a manner well known in the art by adhesion, welding and the like. When the light pipe assembly 82 is mounted to cage assemblies 28, 30, input faces 86 of each light pipe 84 will be positioned so as to reside opposite a respective light source (for example, a light emitting diode or "LED") that is mounted on printed circuit board 11, and output faces 88 of each light pipe 84 will be positioned so as to reside opposite a respective light receiving element mounted on, for example, a mating connector or a chassis of an electronic component.

Figure 6:
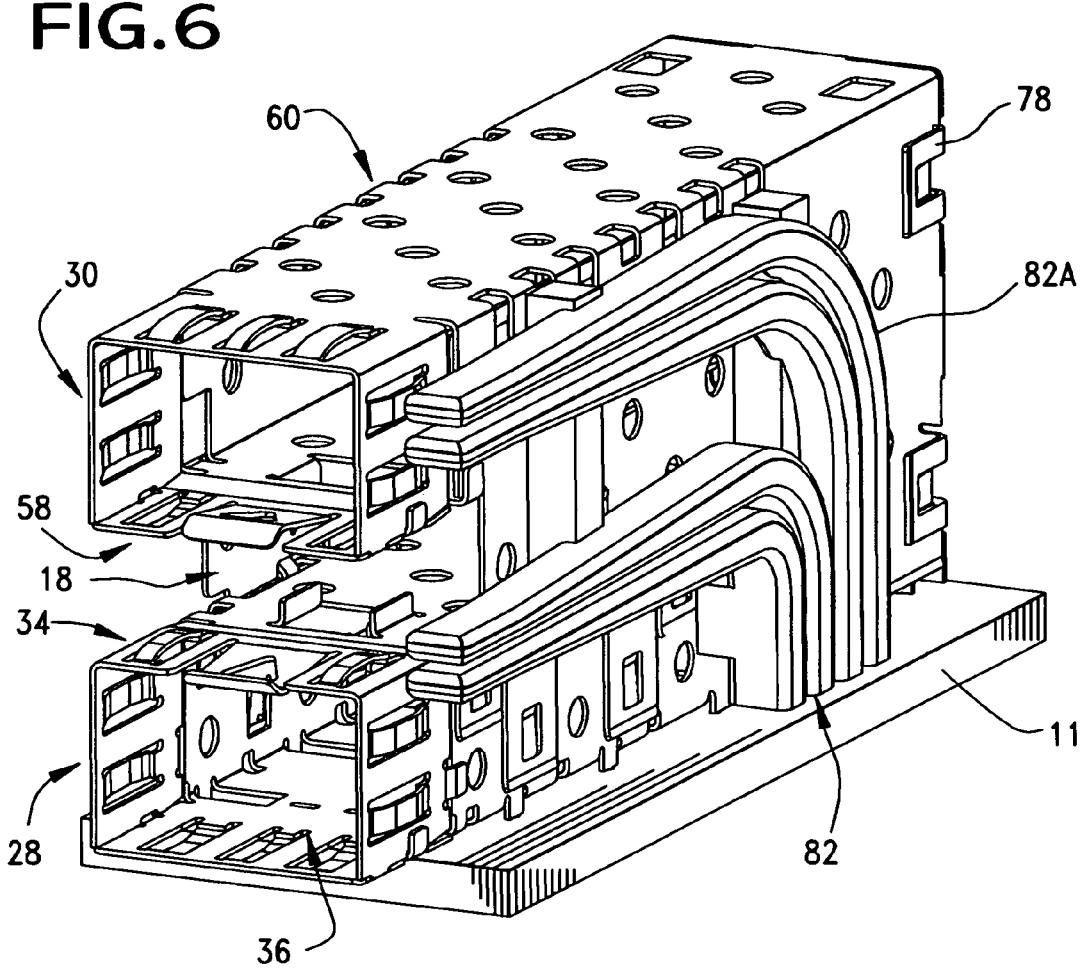
FIG. 6 is a perspective view of the light pipe assembly of FIG. 4 incorporated into the connector assembly, and extending along the sides thereof.

A first embodiment of the connector assembly of the present invention will now be described with reference to FIGS. 4 and 6. As shown in FIGS. 4 and 6, a first embodiment of the present invention, a light pipe assembly 82*a* is externally mounted with respect to cage assemblies 28, 30. FIGS. 4 and 6 show one possible configuration, in which two pairs of light pipes are spaced apart vertically and connected to a pair of support members 92*a*. Light pipe assembly 82*a* may be connected to one or more of the cage assemblies 28, 30 using any one of several known methods. Examples of possible attachment methods include a mating-type connection between complementary features formed in light pipe assembly 82*a* and cage assembly 28, 30, mechanical fasteners, or adhesives. A portion of light pipe assembly 82*a* may also be secured to printed circuit board. One or more light pipe assemblies 82*a* may also be mounted along multiple sides of connector assembly. Thus, a light pipe assembly 82*a* of the first embodiment may be configured in any desired manner to enable attachment to an existing connector assembly and to convey light between light emitting elements and light receiving elements having any one of a variety of spatial locations with respect to the connector assembly.

As may be seen from the above description, the shapes of light pipes 84*a* and the dimensions and positioning of support members 92*a* in this embodiment may be specified such that light may be conveyed between light emitting elements and light receiving sensors having a wide variety of locations in relation to connector assembly 10. For example, as seen in FIG. 6, the configurations of light pipes 84*a* and support members 92*a* may be specified such that light pipe input faces 86*a* will receive light from respective LED's positioned on printed circuit board 11 at various distances from connector assembly 10. Also, the configurations of light pipes 84*a* and support members 92*a* may be specified such that light pipe output faces 88*a* will emit light to light receiving sensors located at any one of a variety of distances from printed circuit board 11. As shown in FIG. 5, the bottom support member 92*b* may extend out from the pair of light pipes at an angle and have an engagement slot that engages a corresponding member on either the exterior shielding cage or the connector housing of the connector assembly.

A second embodiment of the present invention will now be described with reference to FIGS. 5, 7 and 8. Referring to FIG. 5 a light pipe assembly 82*b* may be provided that includes one or more pairs of individual light pipes arranged in pairs. Each assembly 82*b* can be seen to include a pair of adjacent light pipes 84*b* that are attached to one or more support members 92*b*. The light pipes 84*b* each opposing input faces 86*b*, output faces 88*b* and body portions 90*b* that extend between the input and output faces 86*b*, 88*b*. In this embodiment, the light pipes are configured to be mounted within the upper cage cover component 60 as shown by the alternate embodiment arranged in FIG. 7. In this embodiment, the pipes extends within the connector housing recess 20 and cavity 18 formed between housing upper port 16 and housing lower port 14. As shown in FIG. 5, each of the light pipes may include a first bend, shown as a right angle bend, and a second bend, shown as an offset bend interposed between the ends 8-6, 88 of the light pipes. The offset bends may include left to right angled portions 104*b* as explained in greater detail below.

The light pipe assembly 82*b* may extend along a portion of tail aligner 24, behind connector housing 12 and the light pipe assembly 82*b* may be secured to the connector housing 12 such that light pipe input faces 86*b* reside opposite respective LED's mounted on printed circuit board 11 and light pipe output faces 88*b* reside opposite respective light receiving sensors (not shown) mounted on a separate item of electronic equipment. Body portions 90*b* are formed so as to connect input faces 86*b* and output faces 88*b* for conveying light from LED's to the light receiving sensors located proximate output faces 88*b*.

As may be seen in FIG. 5, input faces 86*b* of light pipes 84*b* may be arranged in a "front-rear" configuration with respect to the mating direction of connector assembly 10 indicated by arrow "A". The body portions 90*b* of the light pipes 84*b* include vertical portions 96*b* extending upward from printed circuit board 11 and terminating in right angle bends 98*b*. Horizontal portions 100*b* of light pipes 84*b* extend from right angle bends 98*b* toward a front portion of the connector assembly, terminating in a transition region, generally designated 102*b*. using materials, such as a metal alloy or a plated plastic, that will provide some degree of EM shielding. The endcap also may ensure a proper alignment and spacing between the light pipes so that they will fit in the intervening space between the connector slots. The endcap 108 is adapted to position and secure the light pipe output faces 88*b* and to provide additional EMI shielding for the connector assembly. For these purposes, the end cap 108 may be disposed to create intimate contact with both the upper cage assembly 58 and the lower cage assembly 36. Also, the shroud 108, along with cage assemblies 58, 36, will generally be connected to a grounding member located on printed circuit board 11 or a chassis of another electronic component.

Figure 7:
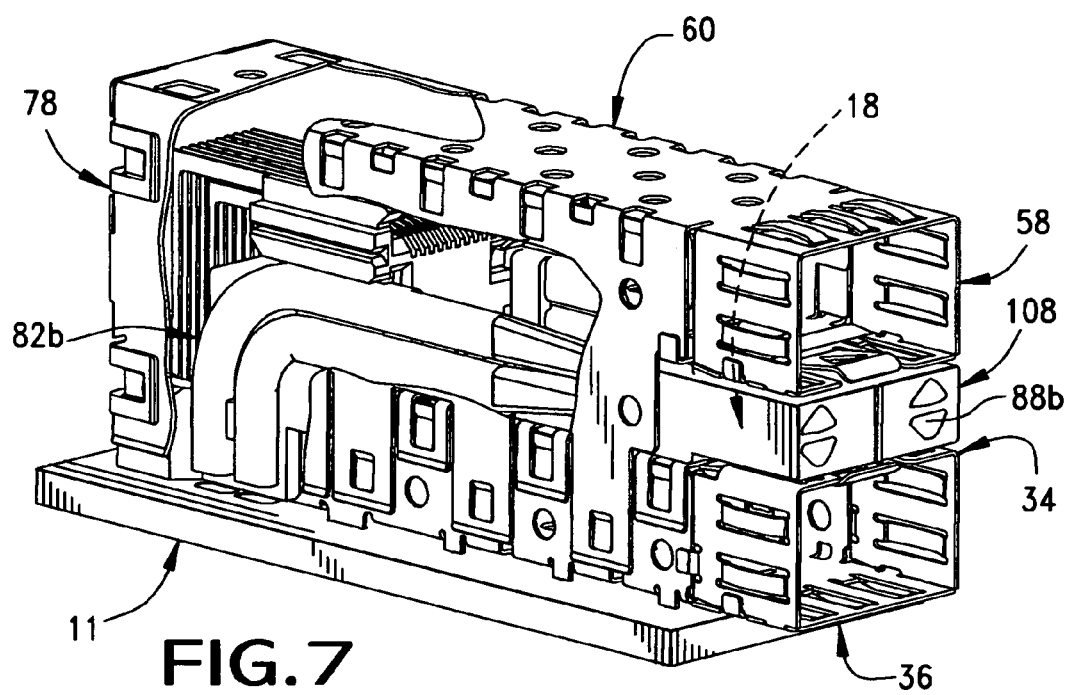
FIG. 7 is a partial cutaway perspective view showing the light pipe assembly of FIG. 5 incorporated into the connector assembly, and specifically disposed within the exterior shield assembly and partially within the space dividing the two module-receiving bays of the connector assembly.
Figure 8:
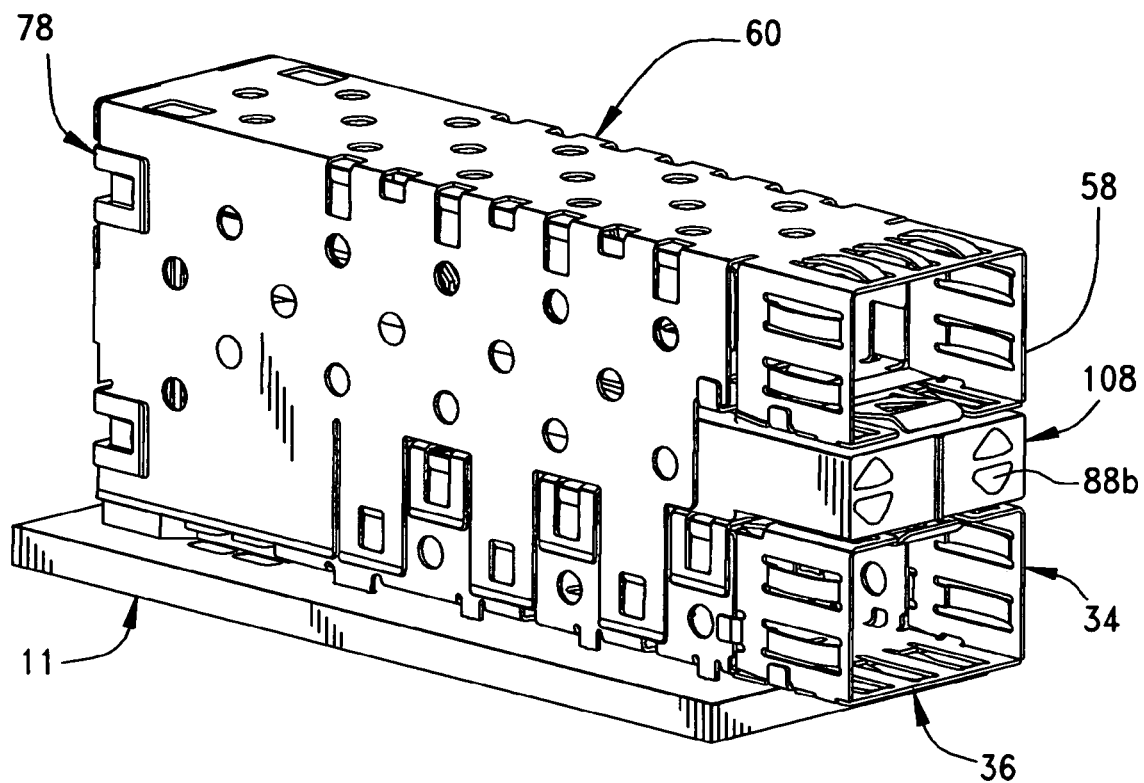
FIG. 8 is the same view of the connector assembly of FIG. 7, but with the shield assembly exterior wall shown in place.

In FIGS. 7 and 8, two light pipe assemblies 82*b* are embodied in two pairs of spaced apart light pipes 84*b* extending along opposite sides of connector housing 12. In this embodiment, the light pipe assemblies 82*b* reside within housing recesses 20, within upper cage cover component 60, and within the cavity 18 formed between upper port 16 and lower port 14. As such, the light pipe assembly 82*b* resides within the existing printed circuit board "footprint" of the connector assembly as defined by connector housing 12 and the cage assemblies that enclose the housing. Thus, this embodiment of the connector assembly incorporates a light pipe assembly therein without occupying additional space on printed circuit board 11.

Assembly of the first embodiment of connector assembly 10 will now be described with reference to FIGS. 1, 2 and 6. In a first step, the terminals are press-fit into connector housing 12. Terminal tail portions 22 are then inserted into tail aligner holes 26 and the tail aligner 24 is secured to connector housing 12, thereby securing tail portions 22 with respect to housing 12. The upper and lower cage assemblies 58, 36 are then secured over the connector housing 20 to upper and lower housing ports 14 and 16, respectively.

The rear wall 78 of the cage assembly is then attached to the shielding cage assembly over the upper and lower assemblies 30, 28 and the upper cover component 60 to enclose terminal tail portions 22, tail aligner 24 and to close off the rear portion of connector housing 12. The rear wall 78 is generally secured in intimate contact with one or more walls of each of upper cage assembly base component 58, upper cage assembly cover component 60, lower cage assembly base component 32 and lower cage assembly cover component 34. As stated previously, mounting pin portions 80 may also be formed on the shielding cage rear wall 78 in a desired pattern to engage and mate with corresponding mounting holes on the circuit board 11. These holes may be plated through holes which are electrically coupled to circuit traces on It may be seen from FIG. 5 that horizontal portions 100b extending forward from right angle bends 98b have an "over-and-under" orientation.

Referring to FIGS. 5 and 7, it may be desired to arrange output faces 88b of light pipes 84b in a "side-to-side" configuration with respect to the connector assembly mating direction. Thus, the configuration of light pipes 84b must transition from the "over-and-under" orientation of horizontal portions 100b to the "side-to-side" configuration. This transition is shown best in FIG. 5. The transition in the configuration of the light pipes between right angle bends 98b and output ends 88b is achieved by forming, in transition region 102b, angled portions 104b in each of the body portions of the light pipes. The transition region 102b preferably resides within housing cavity 18.

FIG. 5 shows one possible arrangement of angled portions 104b in transition region 102b. At points on the light pipe body portions 90b which are located within the housing cavity 18, the body portion 90b of the bottommost light pipe 84b angles inward and upward, while the body portion 90b of the top most light pipe 84b angles outward and downward. The straight sections 106b of the body portions 90b then proceed from angled portions 104b toward a front portion of connector assembly 10 proximate the connector receiving openings in cage assemblies 104b. As seen in FIG. 5, the body portions 90b may be angled such that straight sections 106b are spaced apart from each other and spaced approximately the same distance from printed circuit board 11.

A support member 92b may be positioned between body straight sections 106b proximate angled 104b to position and secure the light pipe straight sections 106b with respect to each other and with respect to connector housing 12. The width of support member 106b may be set to provide and maintain a desired predetermined spacing between straight sections 106b. Also, the length of support member 92b may be set to provide a press fit between upper cage base component 58 and lower cage cover component 34 when light pipe assembly 82b is inserted into the cavity 18 formed between the upper port 16 and lower port 14 of the connector housing. The support member 92b may also be plated with a metallic material to form a conductive member extending between upper cage assembly base component 58 and lower cage assembly cover component 34. This provides additional grounding contact between cage assemblies 28 and 30.

Referring to FIGS. 7 and 8, the portions of light pipe straight sections 106b which include output faces 88b may be received in a shroud, or endcap 108. The end cap 108 is formed printed circuit board 11. These circuit traces are connected to one or more grounding-features, thereby providing a grounding path for electromagnetic energy flowing through cage assemblies 28 and 30. After securing rear wall 78 to upper and lower cage assemblies 28 and 30, the connector assembly 10 may be electrically attached as a single unit to the printed circuit board 11.

Assembly of the second embodiment of connector assembly 12 will now be described with reference to FIGS. 1, 2, 7 and 8. In a first step, the terminals are press-fit into connector housing 12. Terminal tail portions 22 are then inserted into tail aligner holes 26 and tail aligner 24 is secured to connector housing 12, thereby securing tail portions 22 with respect to housing 12. In this embodiment, the lower cage assembly 28 is then secured to the connector lower housing port 14, and the base portion 58 of the upper cage assembly 30 is then attached to the connector upper housing port 16. The light pipe assembly 82b is then press-fit into housing recess 20 and the housing cavity 18. Upper cage assembly cover component 60 is then attached to upper cage assembly base component 60, thereby enclosing light pipe assembly 82b within side walls of upper cover component 60. The spacing between the upper and lower cage assemblies 30, 28 defines a cavity that extends lengthwise of the connector assembly and this cavity accommodates the horizontal extent of the light pipe assemblies.

The rear wall 78 may then attached to cage assemblies 28, 30 to enclose terminal tail portions, tail aligner 24 and the rear portion of connector housing 12 as described above. After securing rear wall 78 to upper and lower cage assemblies 30 and 28, connector assembly 10 may be electrically attached to printed circuit board 11.

Figure 9:
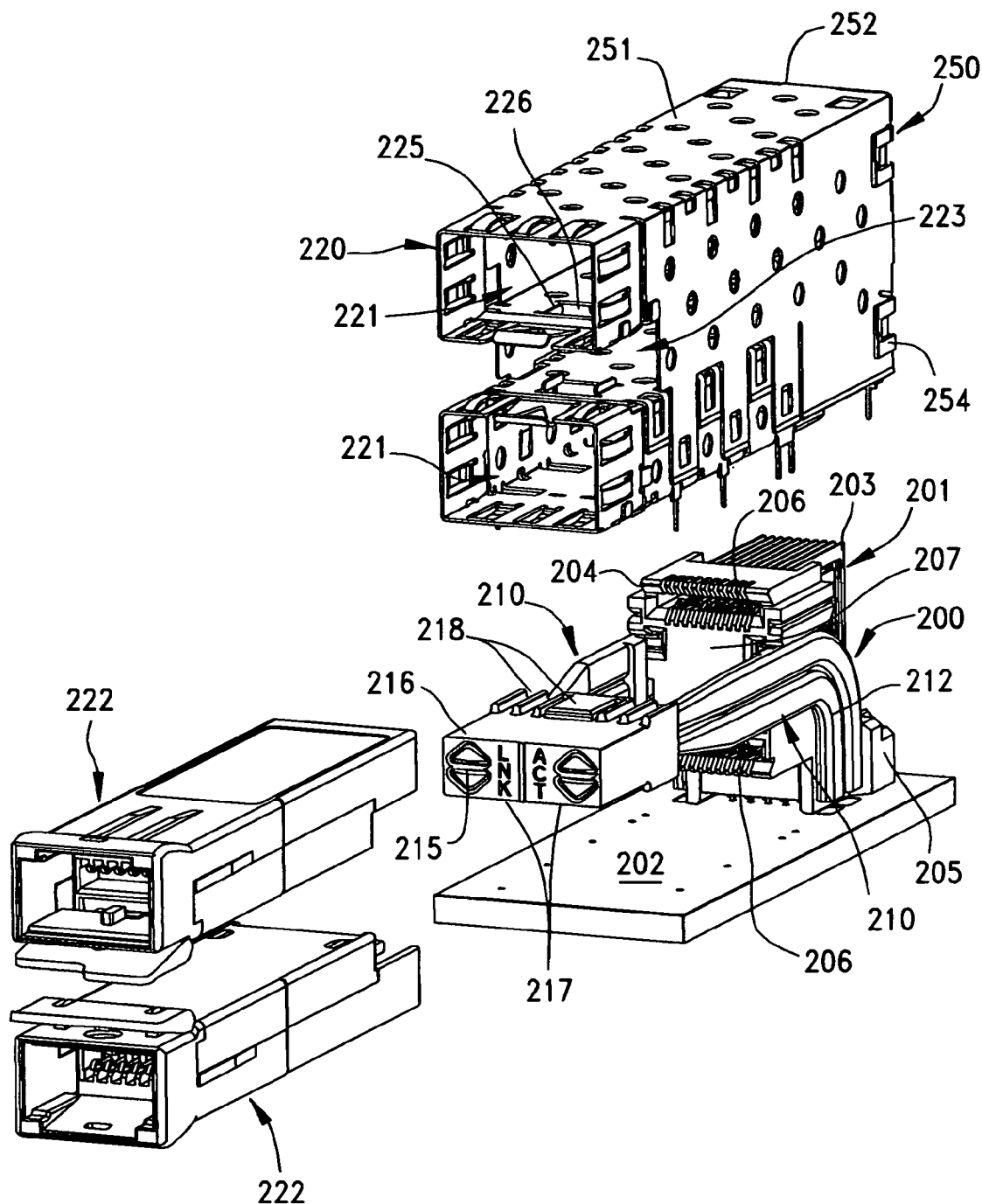
FIG. 9 is an exploded view of a third embodiment of the invention wherein the light pipes engage the connector component of the assembly by way of slots disposed in the front face of the connector components, and which are partially contained within the space separating the two module-receiving bays of the connector assembly.

FIG. 9 illustrates another embodiment of the invention, designated generally as 200 and in this Figure, a connector 201 is shown as supporting a plurality of conductive terminals 203, each terminal of which may be stitched into openings 204 that are disposed in an insulative housing 205 of the connector 201. The connector 201 is shown in its eventual mounting location on a circuit board 202 and the connector housing 205 illustrates in this embodiment includes a pair of card edge connector portions 206 which are disposed in a "stacked", or vertically spaced-apart, fashion along the front face 207 of the connector housing 205. The stacked connectors 201 are enclosed within a metal shielding cage assembly 220 that has two module-receiving bays 221 defined therein. Each of these bays 221 receive an electronic module 222 therein in a fashion that is well known in the art. The module-receiving bays 221 are also stacked or spaced-apart vertically from each other and, due to the cage construction, an intervening space 223 that extends lengthwise through the shielding assembly 220 is defined between the two bays 221.

Figure 10:
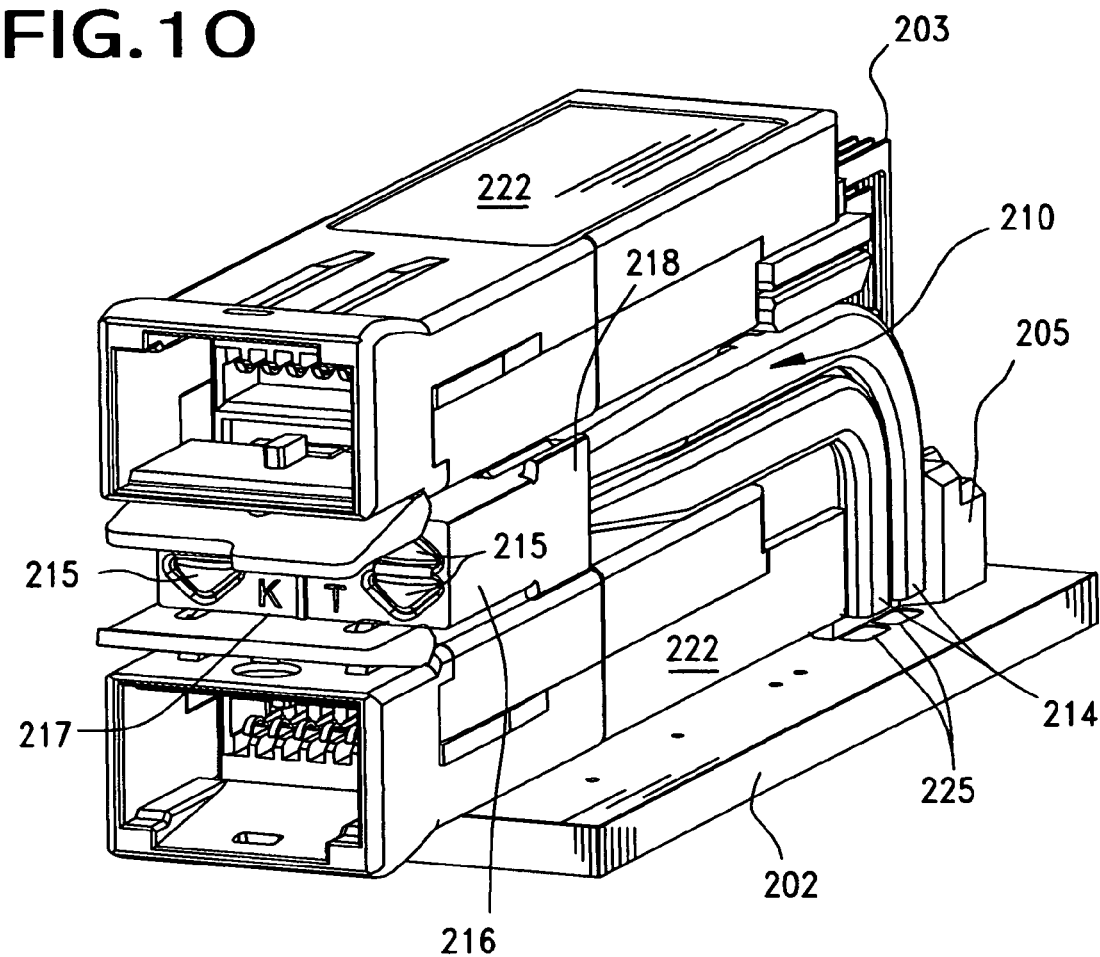
FIG. 10 is the same view as FIG. 9, but with the modules shown in engagement with their associated connector component and with the shielding cage assembly removed for clarity.
Figure 14:
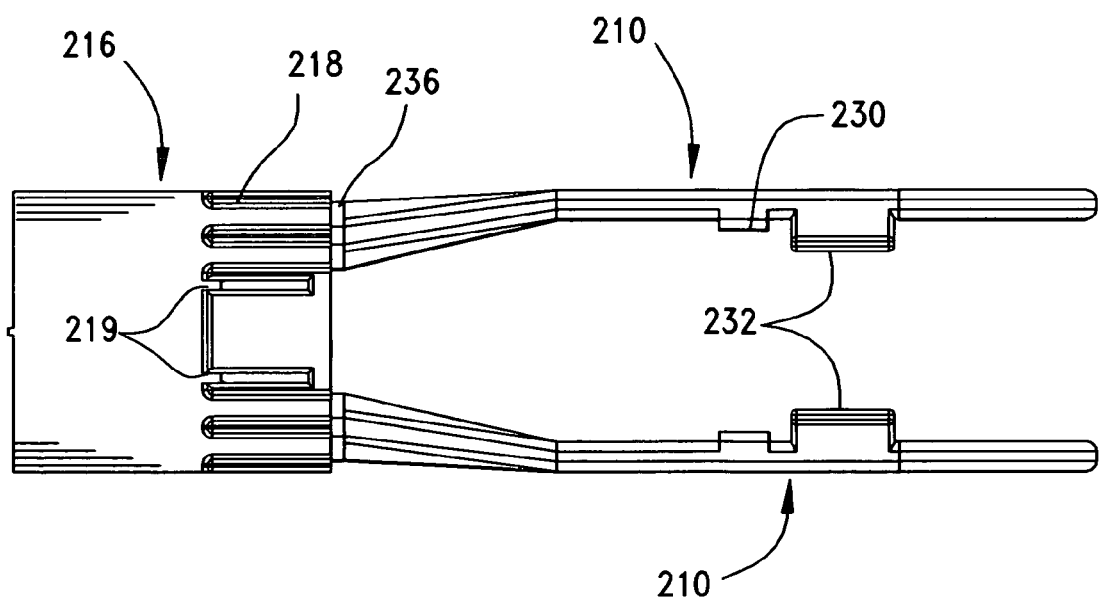
FIG. 14 is a top plan view of the light pipe and end cap assembly of FIG. 11, taken along line 14-14 thereof.

The light pipe assembly 200 of this embodiment includes two pairs 210 of light pipes 212 that extend forwardly of the connector 201 along the sides of the connector housing 205 and into the intervening space 223 between the two bays. The light pipes 212 are generally L-shaped and have first ends 214 (FIG. 10) that are positioned in opposition to illuminators 225 located on the circuit board 202. The second ends 215 of the lights are located on the opposite ends of the light pipes 202 and as illustrated, are preferably held in place and in a selected alignment by an end cap 216, which typically would be formed of a conductive material. This is so that the endcap 216 may provide a means of electrically connecting the two module-receiving bays of the shielding assembly together as well as providing a measure of electromagnetic interference shielding across the intervening space in which it resides. The exterior shielding cage assembly includes a rear wall 250 that may be formed as a separate piece or may be formed as part of the top cage assembly. In the former instance, the rear wall 250 is separately attached to the cage assembly and in the latter instance, it is preferably folded down over the back opening of the cage assembly and then attached to the upper cover 251. Instances where the rear wall 250 is formed as part of the upper cover 251, it is attached thereto along and end 252 and then folded back over the rear opening. In either instance, the rear wall 250 is preferably secured by integrated clips 254 or pins or the like.

The end cap 216 is received within (as are the horizontal portions of the light pipes 202) the intervening space 223 that separates the two bays 221. The end cap 216 may include indicia 217 that identify the function of the connector 200, i.e., whether the modules are connected to the connector or whether the modules are energized or the like.

Figure 11:
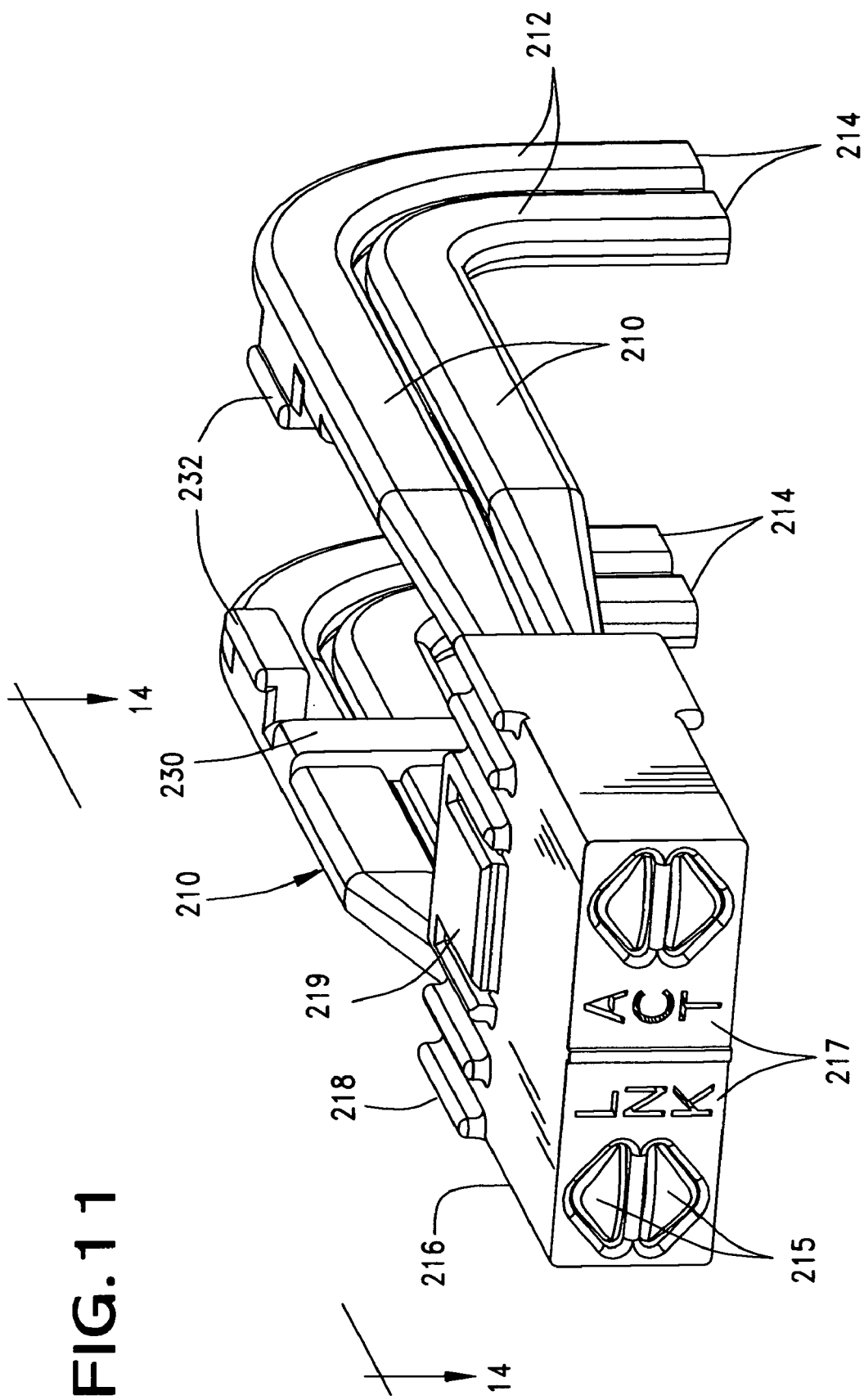
FIG. 11 is a perspective view of only the light pipe assembly of FIG. 9.
Figure 12:
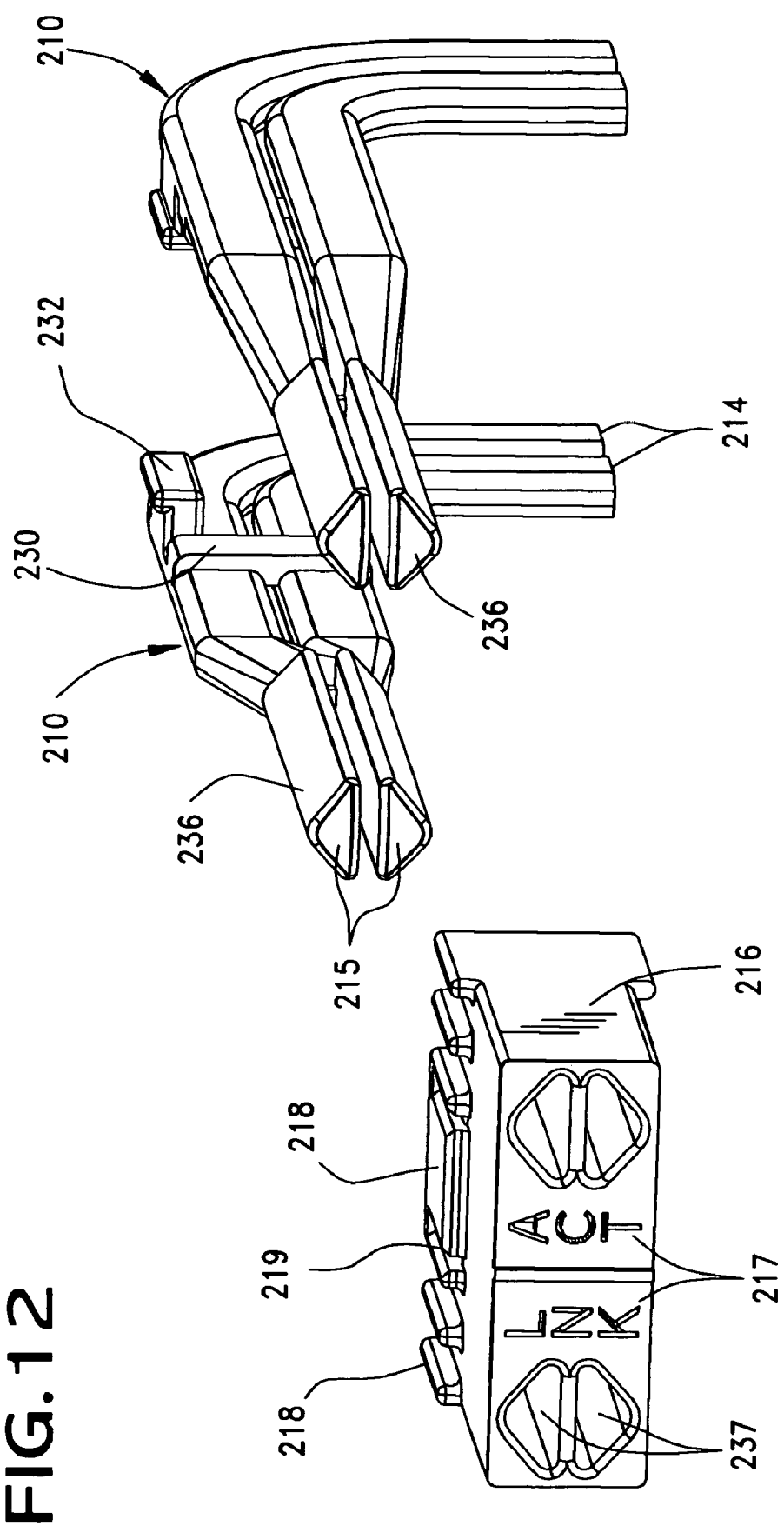
FIG. 12 is the same view as FIG. 11, but with the light pipe end cap shown exploded away from the light pipes for clarity.
Figure 16:
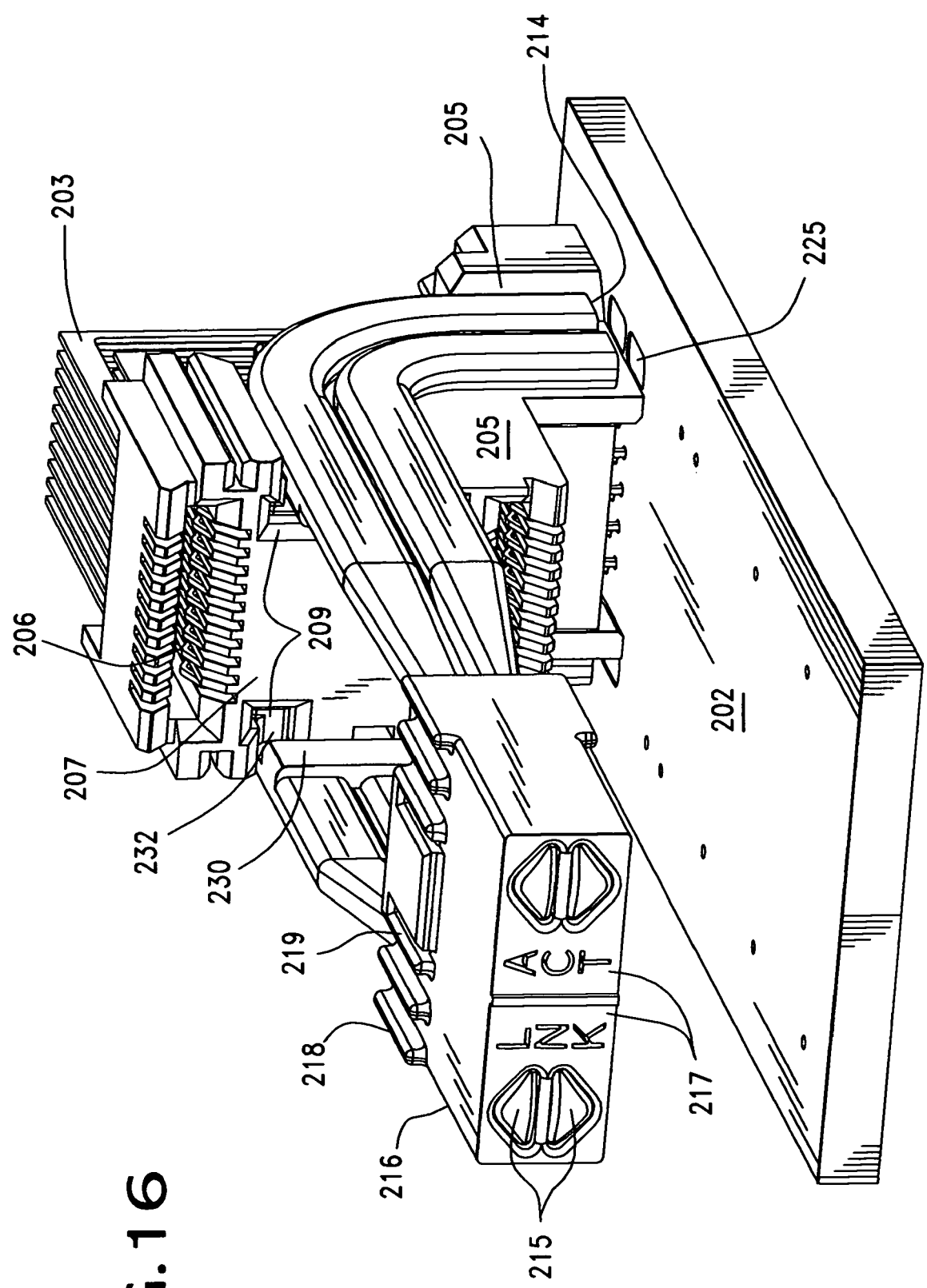
FIG. 16 is an enlarged detail perspective view of FIG. 9, illustrating only the light pipe and end cap assembly engaged with their associated connector component and positioned in place on a circuit board.

As shown best in FIG. 11, the end cap 216 may include a plurality of engagement members, shown as raised members 218 that engage opposing elements formed on the top bay 221 of the shielding assembly 220. Slots 219 may be formed in the members 218 to receive members 225 formed in the top bay 221. (FIG. 9.) Similarly, the square raised member 218 may be received in a like-sized opening 226 that is disposed in the upper cage assembly 220. Each pair 210 of light pipes may further include a support bar 230, shown as vertical, that may be integrally formed with the pair 210 of pipes in order to space the pipes of each pair 210 apart a selected distance. In order to engage the connector and to partially support the pipes in their extent, the pairs of light pipes may further each preferably include engagement members 232, shown as hook-type lugs that extend inwardly of the pipe pairs 210. As shown best in FIG. 16, these lugs 232 are received within cavities, or slots 209 that are formed in the front face of the connector housing 205. As shown in the Figures, the lugs 232 are L-shaped, but any configuration that holds the pipes in place will suffice.

Figure 17A:
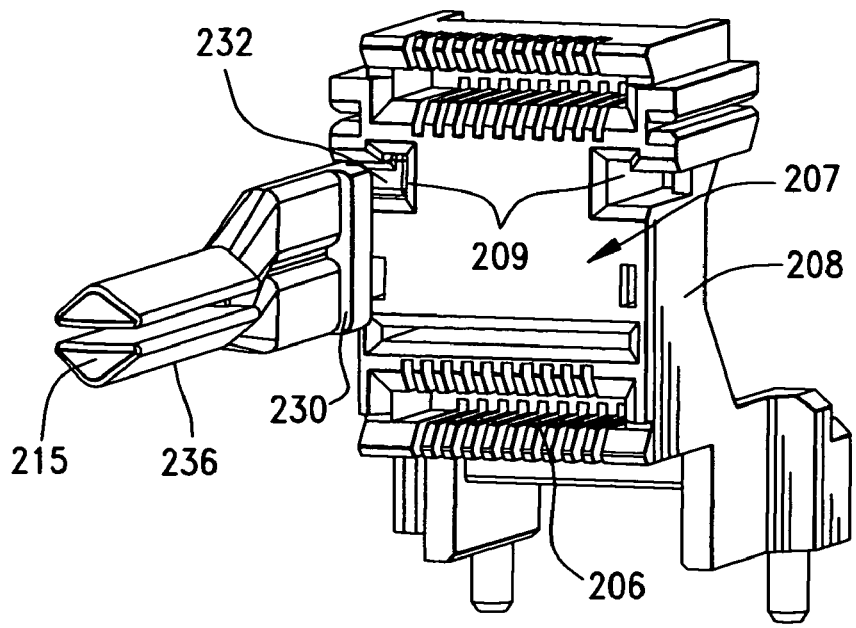
FIG. 17A is a perspective view illustrating the right-side light pipe in engagement with the connector component of FIG. 16.
Figure 17B:
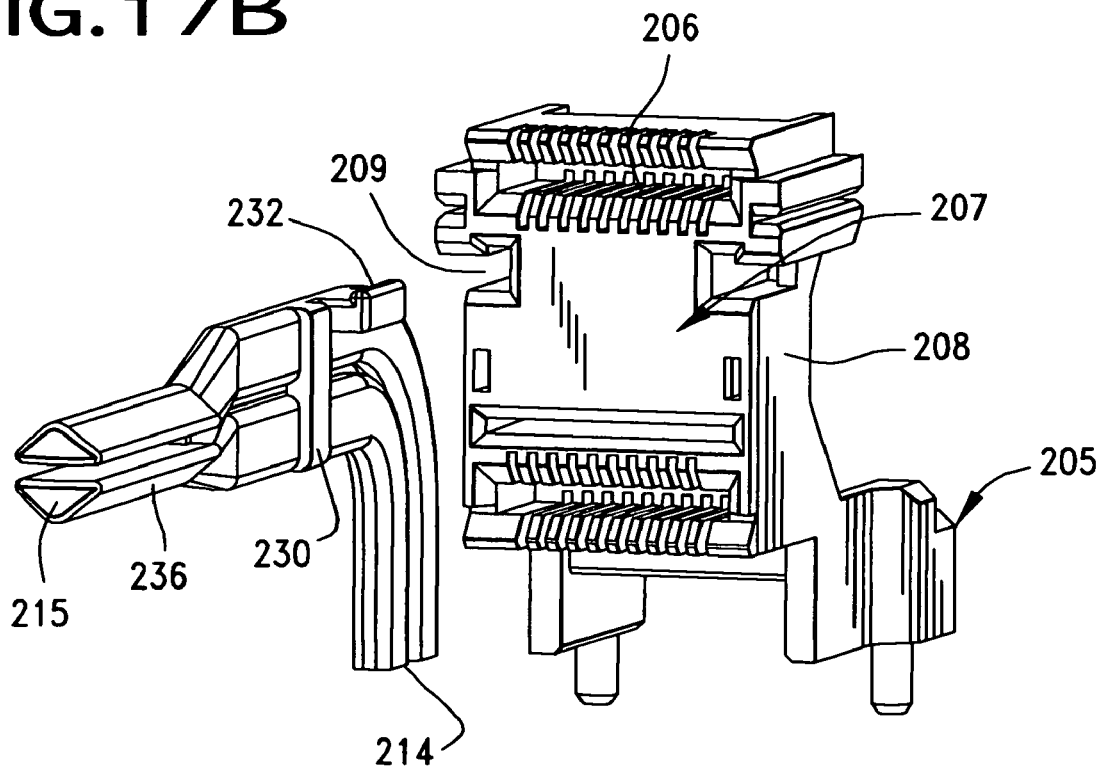
FIG. 17B is the same view as FIG. 17A, but with the light pipe removed from engagement with the connector component to illustrate better the manner of engagement between the two components.

As shown best in FIG. 13, the light pipes may have thick body portions 235 that reduce down in thickness to thin second end portions 236. These thin end portions 236 are received within complimentary shaped openings 237 that are formed in the end caps 216 and also extend lengthwise through the end cap 216. In this regard, the end cap 216 also serves to keep the pipes together in a selected alignment along their lengthwise extent through the intervening space 223 between the two module-receiving bays 221 of the shielding assembly 220. As shown best in FIGS. 17A & 17B, the connector housing 205 has recesses 208 formed along the sidewalls of the connector housing 205, and the recesses are shown as positioned generally on the connector housing 205 at a level midway of the height of the connector housing 205. However, it will be understood that the recesses may be located elsewhere on the connector.

Figure 18:
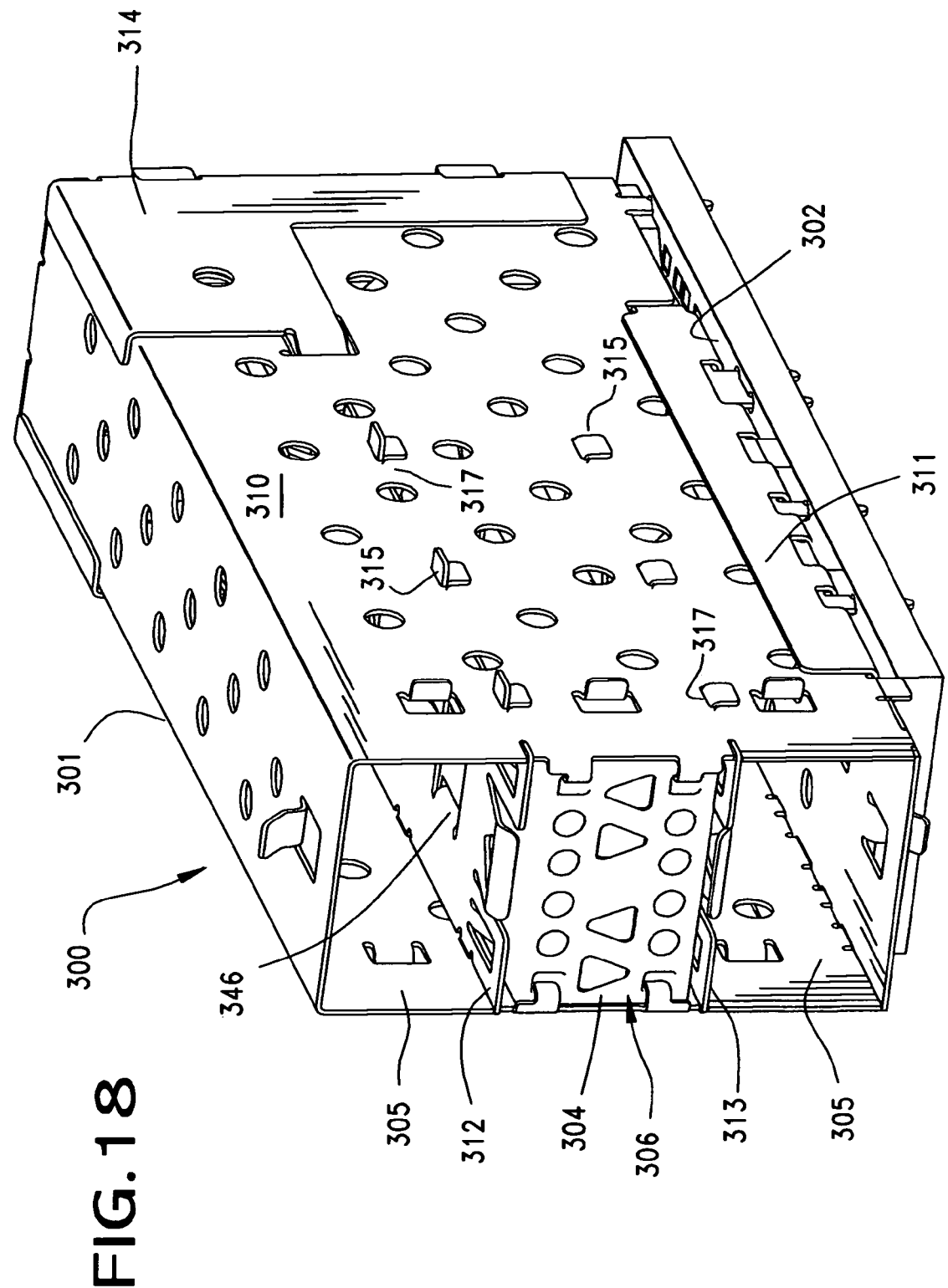
FIG. 18 is a perspective view of a small from factor connector assembly utilizing another, or fourth, embodiment of a light pipe assembly constructed in accordance with the principles of the present invention.

FIG. 18 illustrates a fourth embodiment of a connector assembly that incorporates light pipes constructed in accordance with the principles of the present invention. In FIG. 18, only the shield assembly 301 is illustrated along with the circuit board 302 and the light pipe end cap 304. In assembly, the shield assembly 301 receives the connector housing 205 from the rear opening and then the rear wall member 314 is applied to the shield assembly 301 so as to form an integrated assembly that is applied to the circuit board 302 as a single element, rather than applied over a discrete connector applied to the circuit board. The shield assembly 301 is configured to define a pair of module-receiving bays 305 that are spaced apart from each other in the vertical direction so as to be considered stacked upon each other. The bays 305 are separated by an intervening space 306 that is shown occupied by the end cap 304 and through which the light pipes extend. The shielding assembly 301 is shown as including a hollow enclosure 310 that has a bottom wall 311, intervening walls 312, 313 and a rear wall 314 that closes off the enclosure after the connector and light pipe assemblies have been inserted through the rear of the shielding assembly 301. The intervening walls 312, 313 have tabs 315 that extend into and preferably through openings 317 that are formed in the side walls of the enclosure 310.

Figure 19:
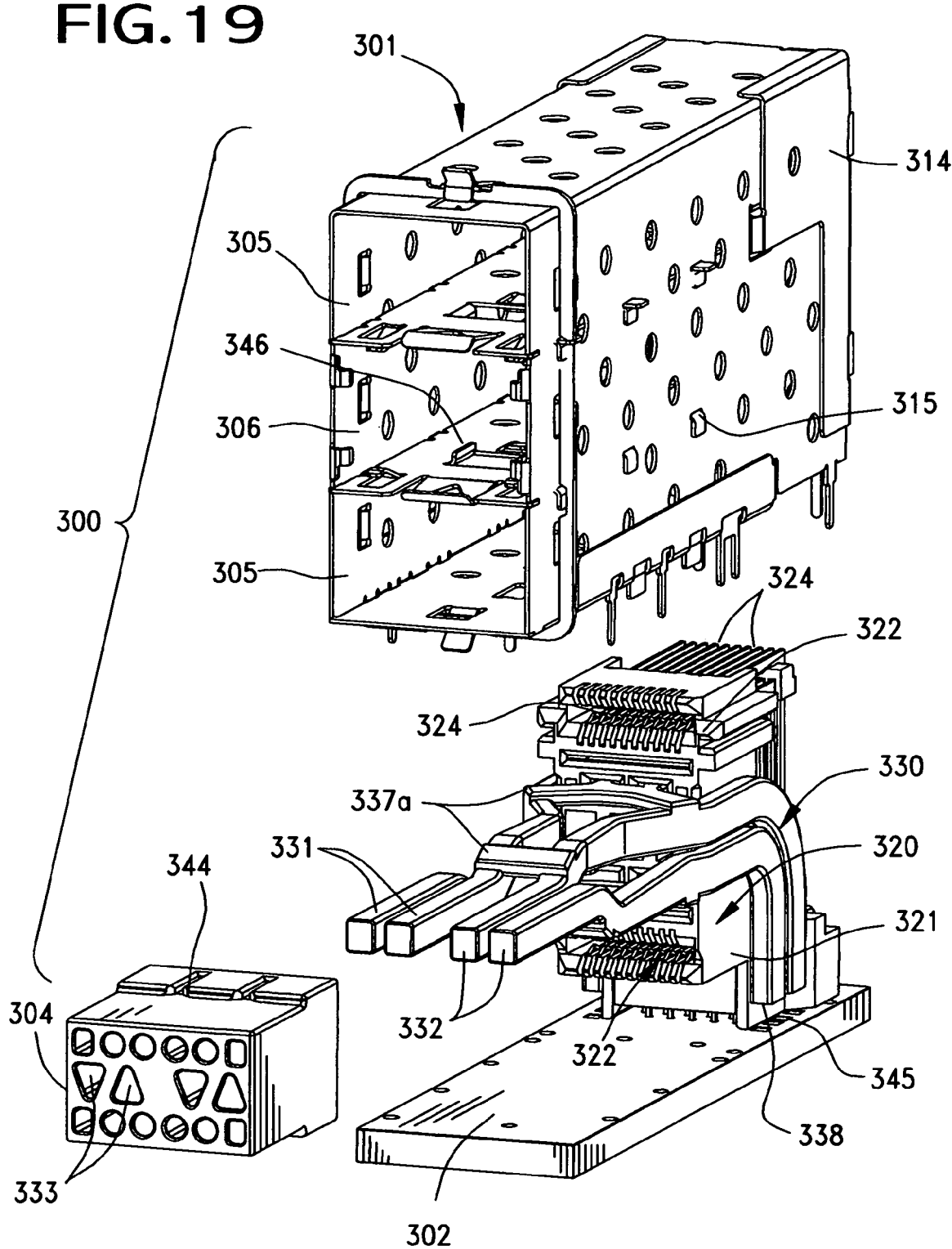
FIG. 19 is a perspective view, partially exploded, of the connector assembly of FIG. 18.

Turning now to FIG. 19, the shielding assembly 301 has been removed from the circuit board 302 for purposes of clarity in order to expose the internal connector 320 and the light pipe assembly 330 to view. The connector component 320 includes an insulative housing 321 with two edge card-receiving slots 322 spaced vertically apart from each other so that each slot 322 is aligned with one of the two module-receiving bays 305. The connector housing 321 includes a plurality of cavities, each of which receives a single conductive terminal 324 therein. As is known in the art, each terminal may include a contact portion that is exposed within the card slots 322. A light pipe assembly 330 is provided and it includes two pairs of light pipes 331 that are separated from each other in the horizontal direction. These pipes have indicator ends 332 that are received within an insulative end cap 304, and the end cap includes openings 333 which communicate to the pipe indicator ends 332.

Figure 21:
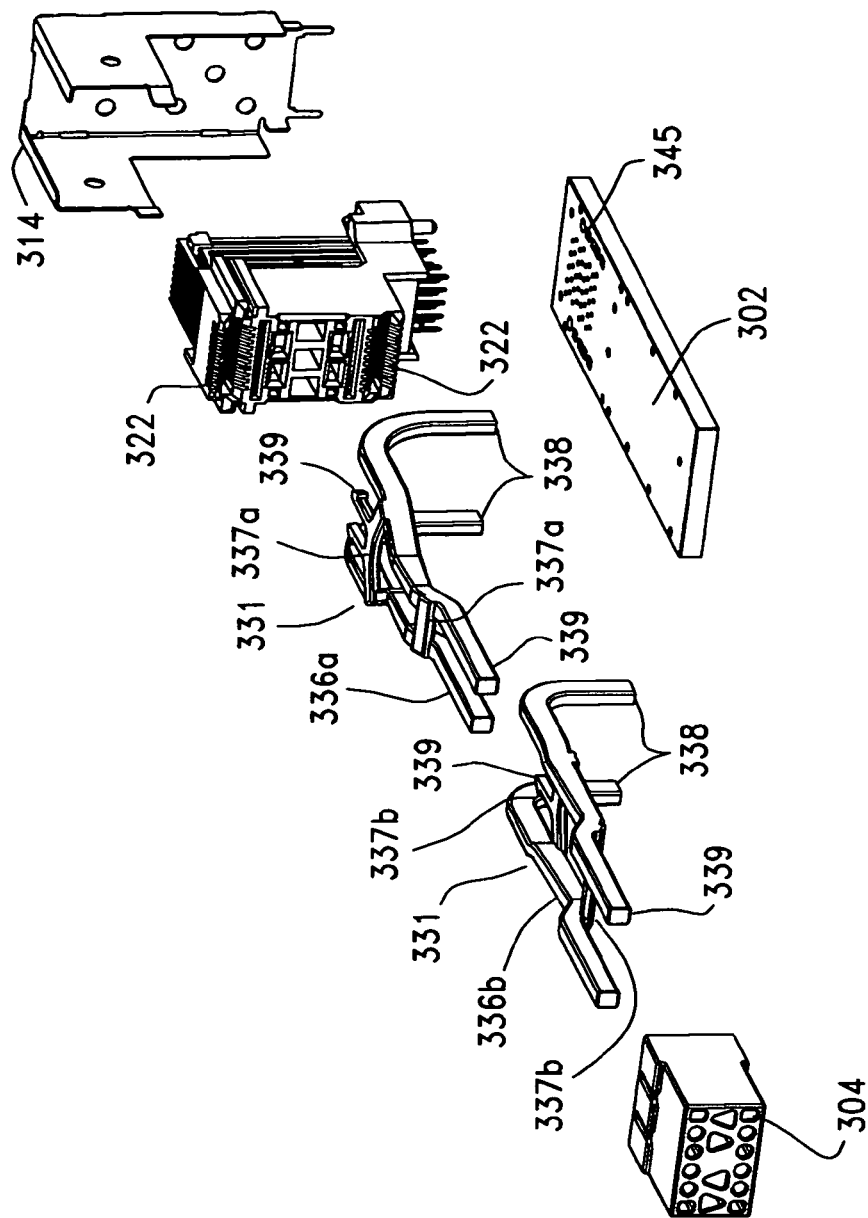
FIG. 21 is the same view as FIG. 20, but fully exploded to illustrate all of the components of the overall assembly in which the present invention is used.
Figure 22:
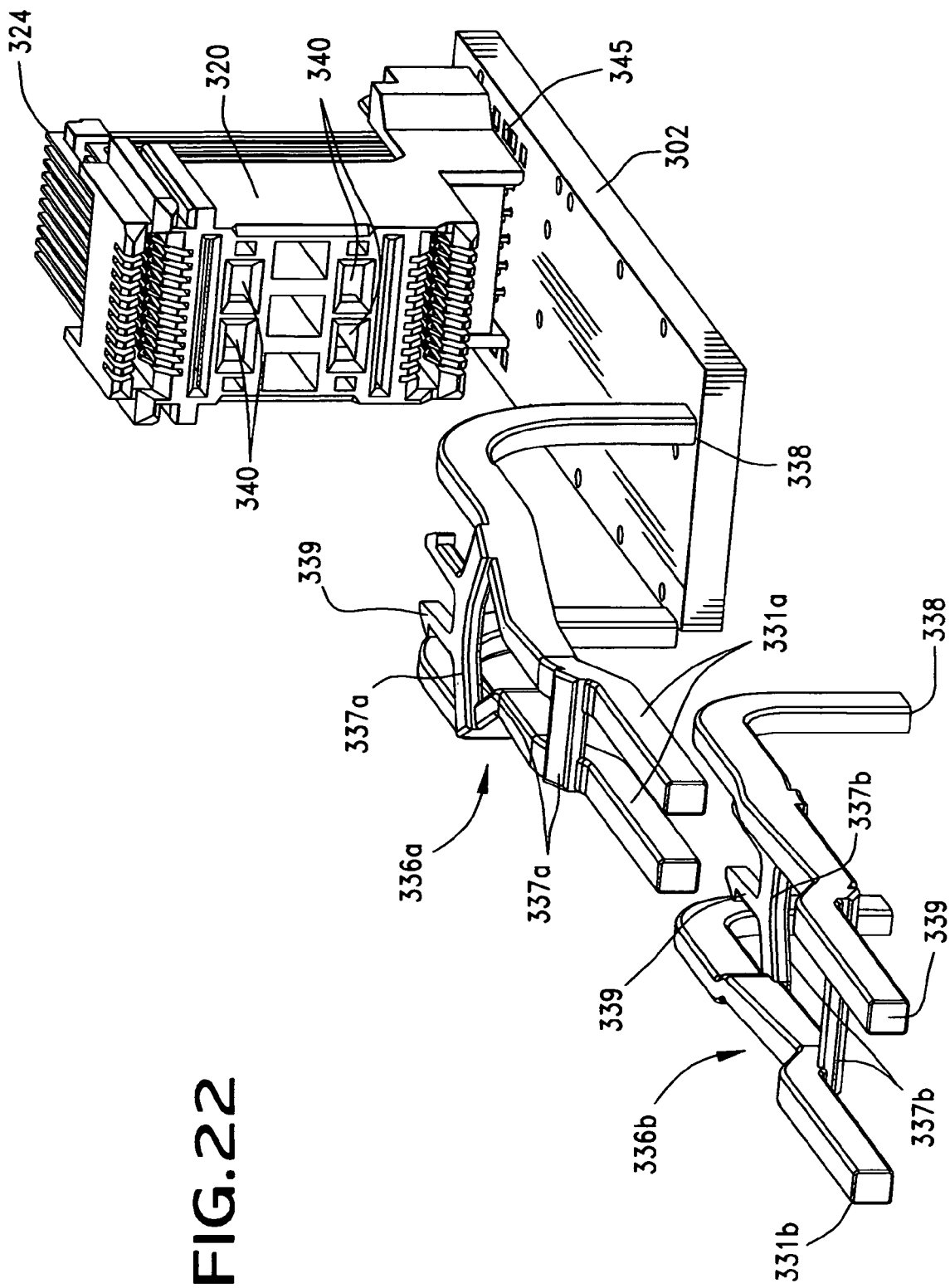
FIG. 22 is a perspective view illustrating the light pipes spaced apart from their associated connector component.

As shown best in FIG. 21, the light pipe assembly 330 preferably includes two distinct elements, which may be referred to as first and second arrays 336a, 336b of light pipes. Each such array 336a, 336b includes two light pipes 331 that are spaced apart from each other. The spacing between the two pipes is closer in the first array 336a than it is the second array 226b. (FIG. 22.) In this manner the light pipes 331 of the first array 336a may be received within the space between the two pipes 331 of the second light pipe array 336b. In such a fashion, the first array 336a may be considered as at least partially "nested" within the second array 336a.

Figure 23A:
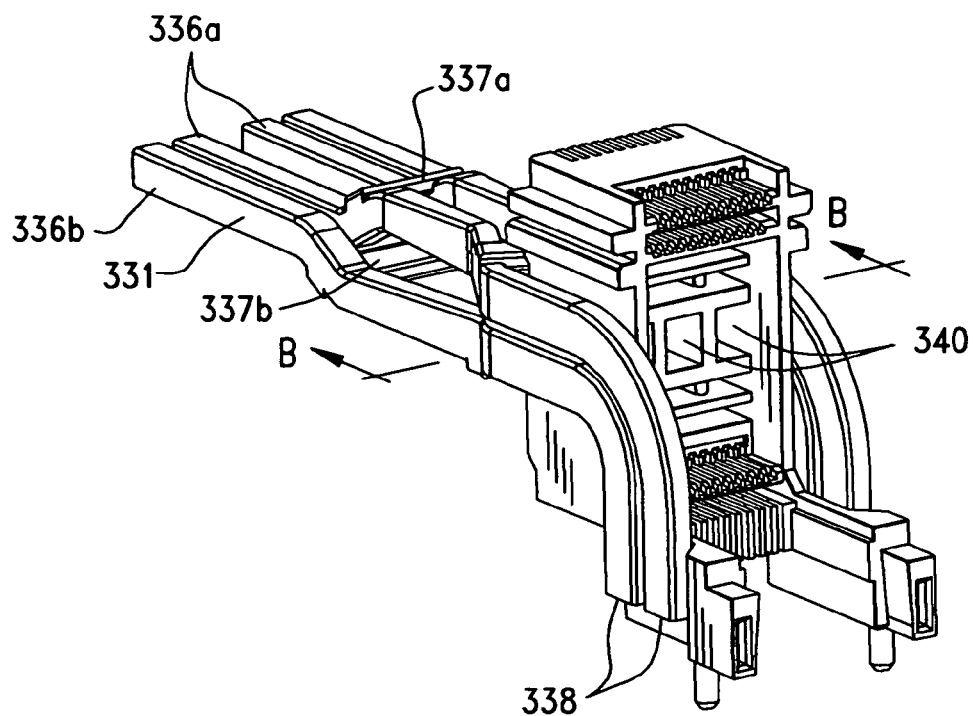
FIG. 23A is a perspective view of the light pipe-connector component assembly, and taken from the rear thereof to illustrate the manner in which the light pipes extend along the sides of the connector component to face the circuit board illuminators.
Figure 26A:
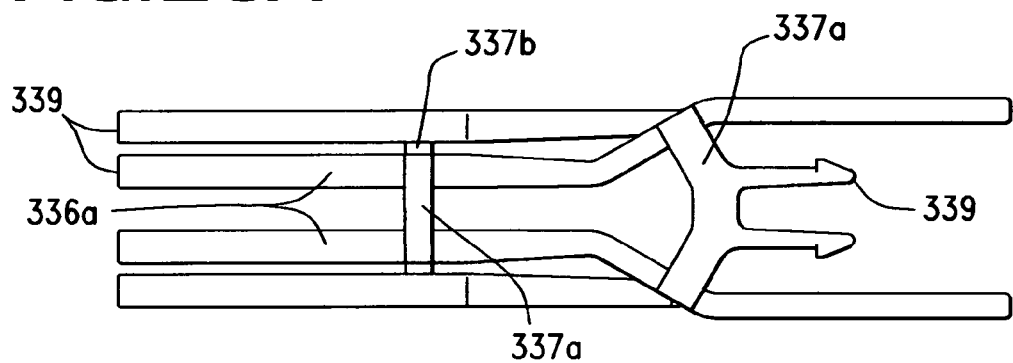
FIG. 26A is a top plan view of the first and second pairs of light pipes nested together.
Figure 26B:
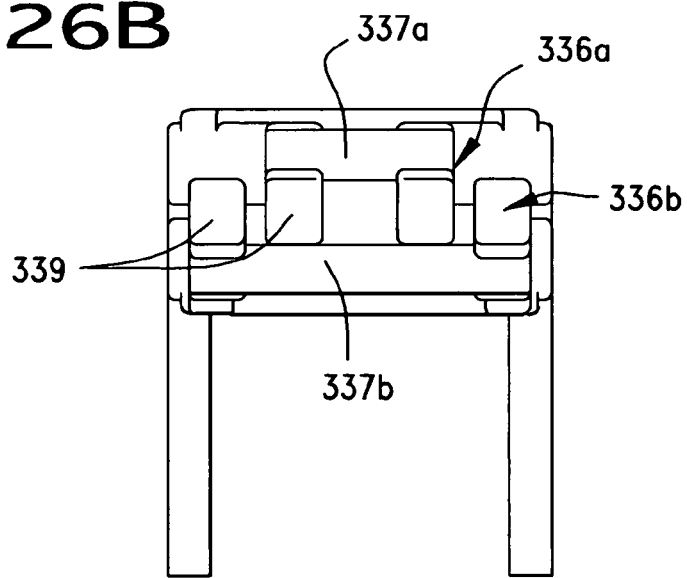
FIG. 26B is a front elevational view of FIG. 26A, showing the two pairs of light pipes in line together.

Similar to the other embodiments, the two light pipes 331 of each array 336a, 336b are held together in their spacing by a support or tie bar 337a, 337b which extends horizontally somewhat above the light pipes 331 of the first array 336a and somewhat underneath the light pipes 331 of the second array 336b. The light pipes are generally L-shaped with at least one bend formed therein genrally at a right angle, and have opposing ends 338, 339, with one end 338 being positioned over or on a illuminator device 345 disposed in the circuit board 302 near the sides of the connector 320. With the support bars 337a,b of the light pipe arrays 336a,b being inverted, it is possible to place the first array 336a of pipes on and within the second array 336b of pipes. The support bars 337b of the second light pipe array 336b in effect, define a "nest" into which the horizontal extent of the first light pipe array 336a are received. This nesting is shown best in FIGS. 23A, 26A & 26B. In order to facilitate the nesting of the two pairs of light pipes, the light pipes may have additional bends formed therein, shown in the horizontal portions of the light pipes and these offset bends facilitate the nesting of one pair of light pipes within the other pair of light pipes.

Figure 20:
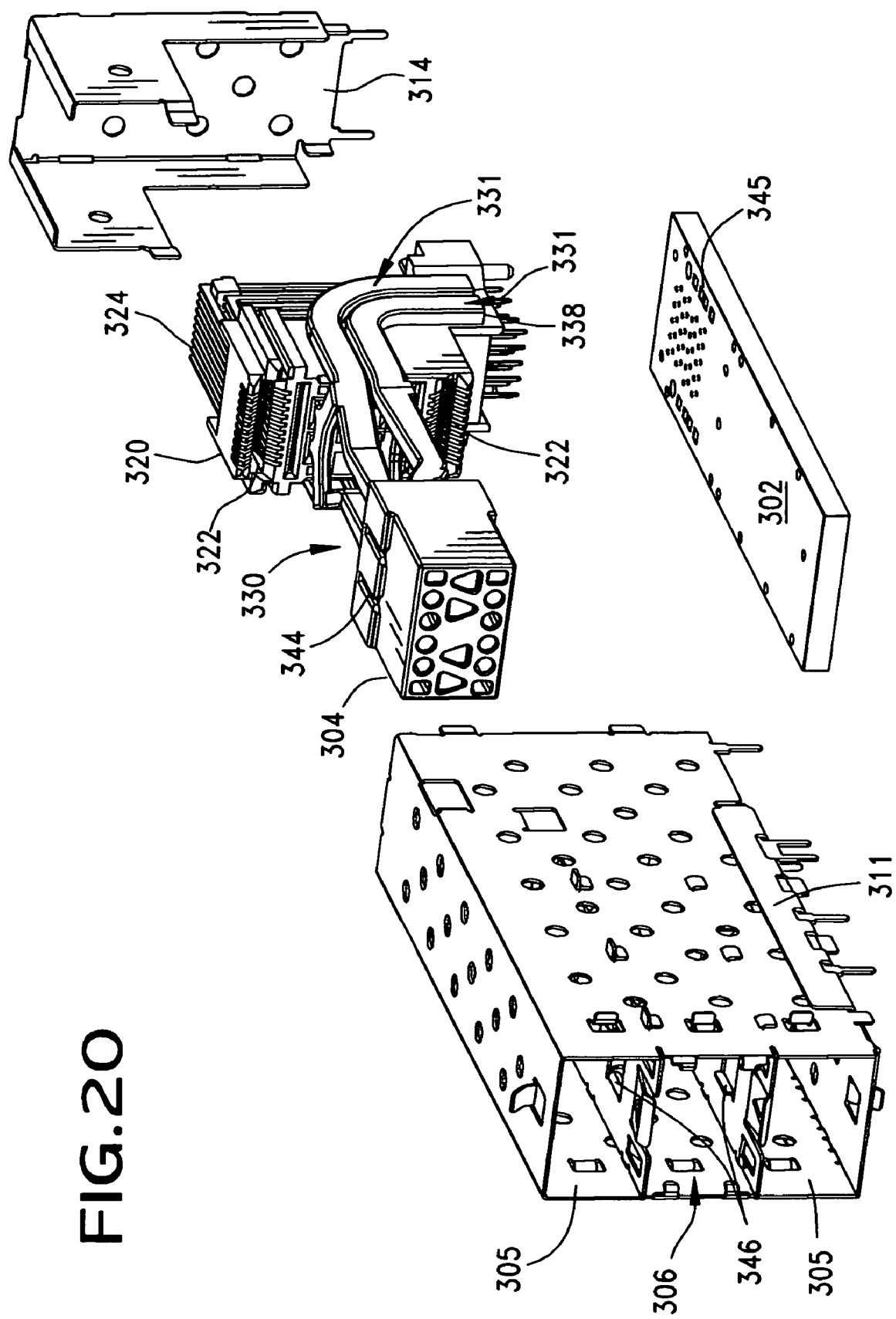
FIG. 20 is the same view as FIG. 19, but with the light pipe and connector assembly shown separated from the circuit board and the shield rear end removed to illustrate the manner of insertion of the light pipe-connector assembly into the shielding cage.
Figure 23B:
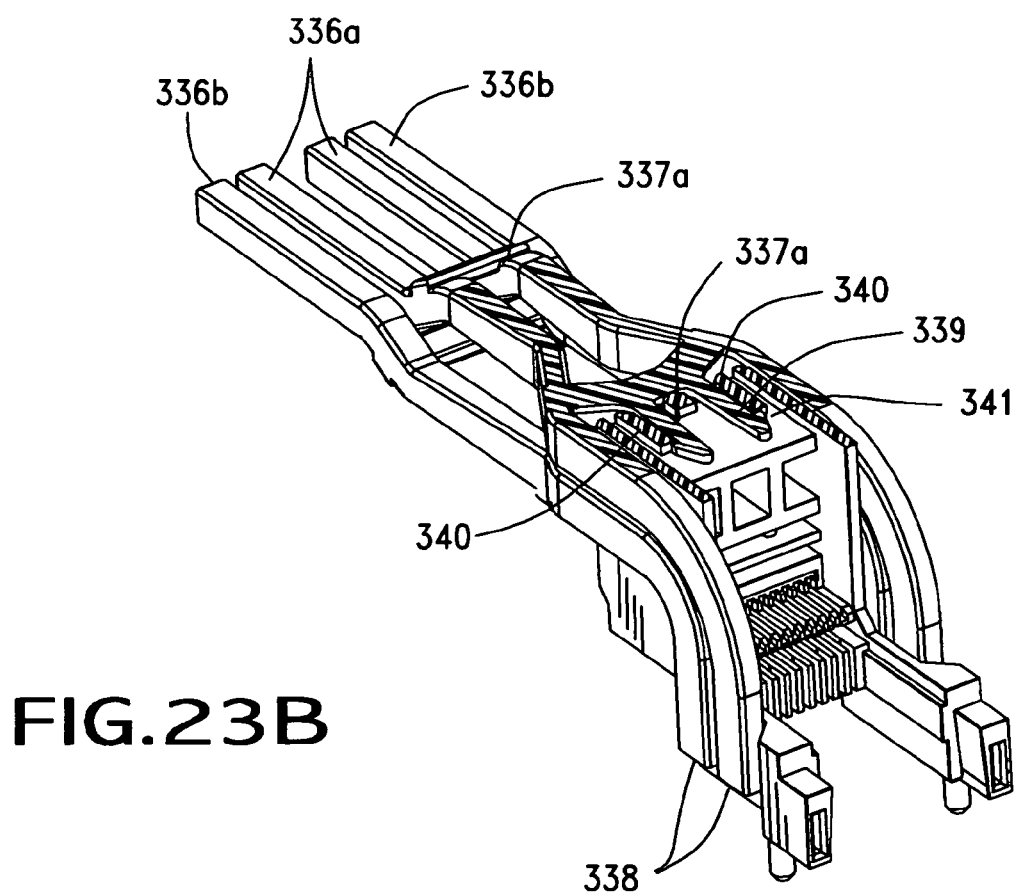
FIG. 23B is the same view as FIG. 23A, but sectioned along line B-B thereof.
Figure 25B:
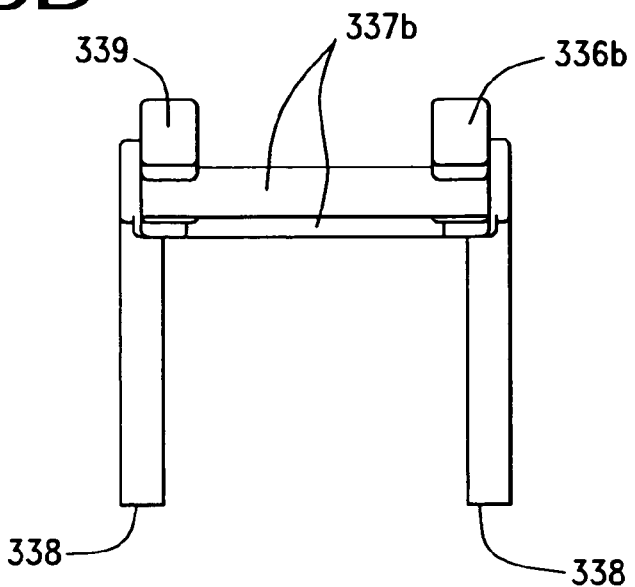
FIG. 25B is a front elevational view of FIG. 25A, showing the outer pair of light pipes.

The rearmost support bars 338a,b of each of the light pipe arrays 336a, b include means for engaging the connector 320 and such means are illustrated as pairs of engagement hooks 339 that extend rearwardly from their support bars 338a, b. These hooks 339 are received within recesses 340 that are formed in the connector housing 321 and which, as shown best in FIG. 23B, include shoulder portions 341 which the engagement hooks 339 engage. The engagement hooks 339 of the first array 336a are received in the top row of recesses 340 as shown in the sectional view of FIG. 23B, and the engagement hooks 339 of the second array 336b are received within the bottom row of recesses 340. (FIG. 20.)

The offset nature of the support bars 337, 338a,b also facilitates the fitting of the light pipes into the intervening space 306 between the top and bottom bays 305 by reducing the overall height of the horizontal extent of the light pipe arrays 336a,b. The end cap 304 may include slots 344 that are formed on the top and bottom surfaces thereof receive stubs 346 formed on the intervening walls of the shielding assembly 301.

Figure 27:
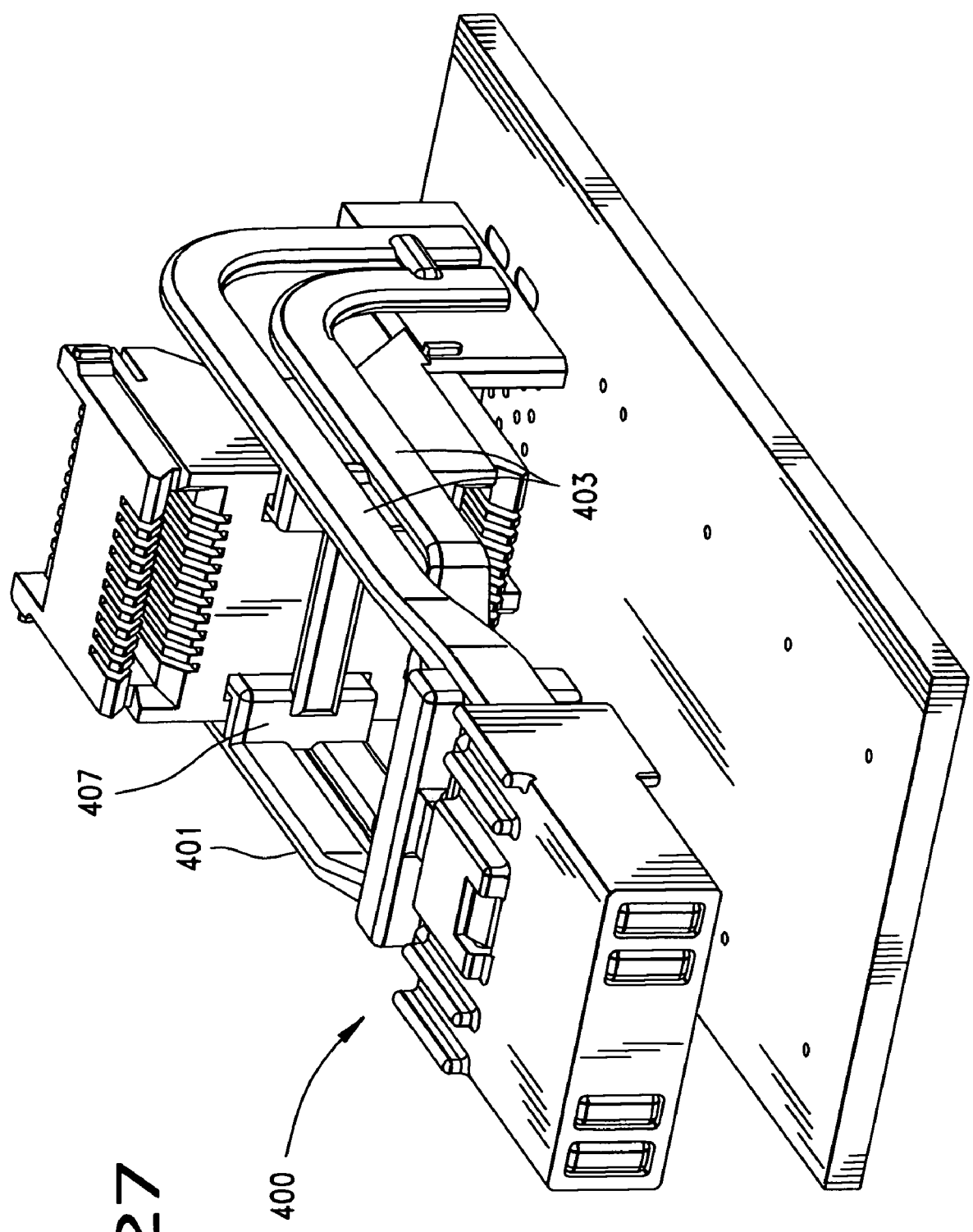
FIG. 27 is a perspective view of another alternate embodiment of a light pipe, endcap and connector assembly; and, FIG. 28 is an exploded view of FIG. 27.
Figure 28:
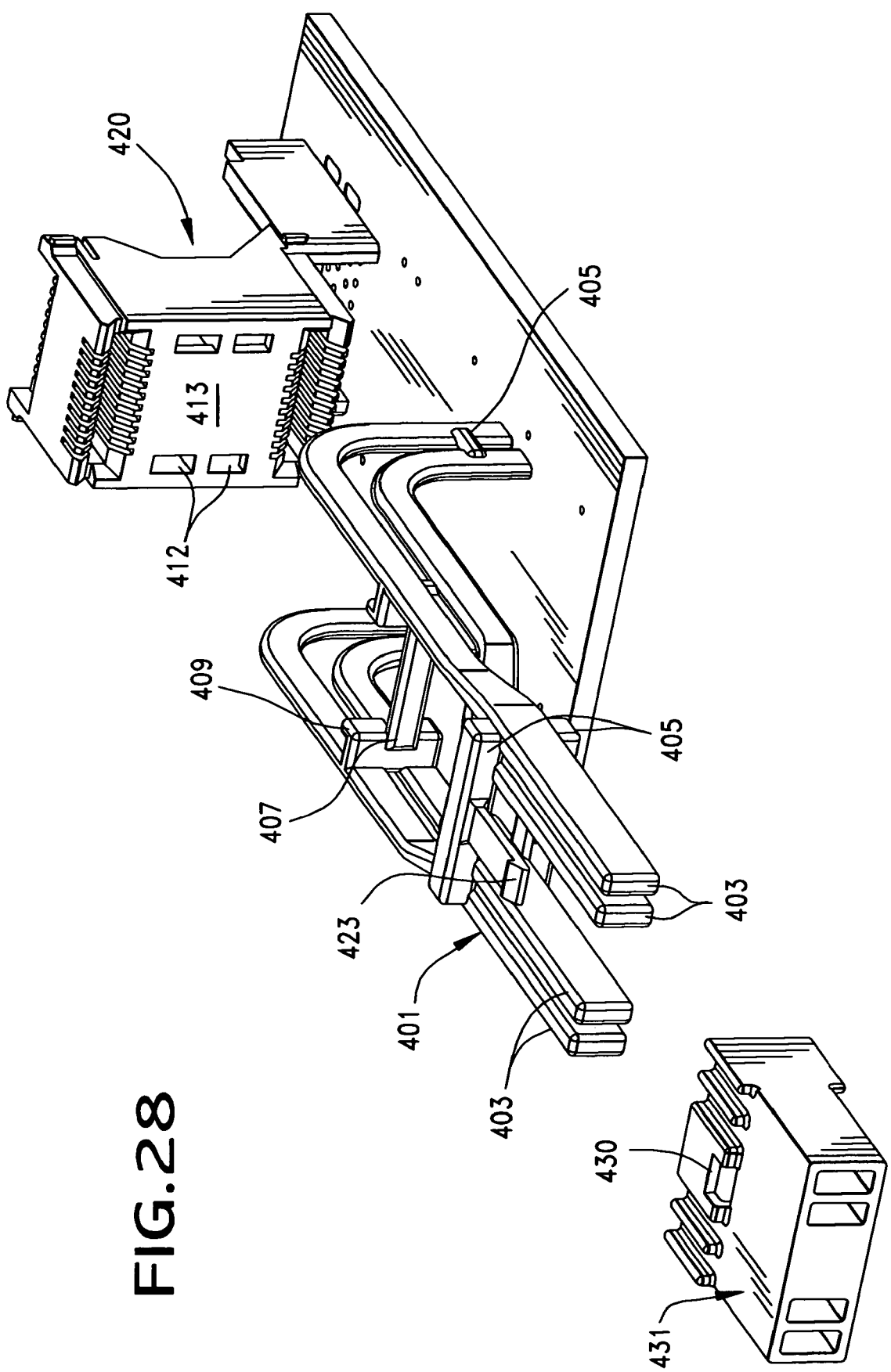

FIGS. 27 and 28 illustrate a fifth embodiment 400 of the present invention in which the light pipe assembly 401 is integrally formed as a single piece, such as by injection molding or any other suitable process. As shown in FIG. 28, the light pipe assembly 401 has two pairs of light pipes 403 associated with it which are interconnected together by support members 405 to form a lattice-like structure. The support members 405 are shown as interconnecting together both the vertical portions and horizontal portions of the light pipes. Another set of support members 407 may interconnect the horizontal portions and may include engagement members 409 formed therewith, which are received within corresponding openings 412 disposed in the front face 413 of the associated connector component 420. The forwardmost support member 405 may also include an engagement member, shown as a hook member 423 that engages the shoulder 430 of an end cap 431. Once again in this embodiment, the light pipe assembly 401 is supported entirely along the front face 413 of the connector 420 and not by any side portions thereof, which assists in reducing the overall width of the connector assembly and exterior shielding assembly (not shown).

While the preferred embodiment of the invention have been shown and described, it will be apparent to those skilled in the art that changes and modifications may be made therein without departing from the spirit of the invention, the scope of which is defined by the appended claims

The invention claimed is:

1. A connector assembly with means for providing an indication of a state of operation of the connector, comprising:
a connector housing, the connector housing have a front face, two side faces and a rear face, said connector housing further including two receptacle portions for receiving mating portions of two distinct corresponding opposing members when said opposing members are mated to said connector assembly, the two receptacle portions being spaced vertically apart from each other within said connector housing;
an array of light pipes formed from a light transmitting material, each of the light pipes having a body portion, with a connecting end and a display end disposed at opposing ends thereof, the light pipe array having engagement members for engaging the connector housing, said light pipes being arranged in said array such that said light pipe connecting ends are disposed adjacent the side faces of said connector housing and said light pipe body portions and display ends extend away from said front face of said connector housing and are in a disposed in a space between said vertically spaced apart connector housing receptacle portions.

2. The connector assembly of claim 1, wherein said light pipes include a first pair of light pipes which are spaced apart from each other in a first preselected spacing by integral bridging portions that extend transversely to said first pair of light pipes, at least one of the bridging portions including a first engagement member extending therefrom for engaging a first slot disposed in said connector housing; and,
a second pair of light pipes, the second pair of light pipes being spaced apart from each other in a second preselected spacing by integral bridging portions that extend transversely to said second pair of light pipes, at least one of the bridging portions including a second engagement member extending therefrom for engaging a second slot disposed in said connector housing; and,
said first preselected spacing being wide enough to accommodate said second pair of light pipes between said first pair of light pipes.

3. The connector assembly of claim 1, wherein said connector housing includes slots disposed on its front face between said vertically spaced apart connector housing receptacle portions for engagement by said light pipe array engagement members.

4. The connector assembly of claim 1, wherein said connector housing includes slots disposed on at least portions of said side faces thereof for engagement by said light pipe array engagement members.

5. The connector assembly of claim 4, wherein said connector housing slots are disposed on both said front face and said side faces of said connector housing between said vertically spaced apart connector housing receptacle portions.

6. The connector assembly of claim 1, further including an end cap for covering portions of said light pipe display ends, and said light pipe array includes at least one member for engaging the end cap.

7. The connector assembly of claim 6, wherein said light pipes are formed from an insulative material and said end cap is conductive.

8. The connector assembly of claim 1, wherein each of said light pipes includes a plurality of bends formed therein and interposed between said input and display ends.

9. The connector assembly of claim 8, wherein each of said light pipes includes a right angle bend and at least one offset bend.

10. A light pipe assembly for providing an indication of a state of operation of an associated connector, comprising:
a first array of at least two light pipes formed from a light transmitting material, each of the pipes including an input end and a display end disposed at opposing ends thereof, the two pipes of the first array being joined together and spaced apart from each other by a first support bar in a first spacing, the first support bar being disposed above said first array of light pipes so that said first array of light pipes depend downwardly therefrom;
a second array of at least two light pipes, separate from the first array, and also formed from a light transmitting material, each of the pipes including a connecting end and a display end disposed at opposing ends thereof, the two pipes of the second array being joined together and spaced apart from each other in a second spacing by a second support bar, the second support bar is disposed below said second array of light pipes, so that said second array of light pipes extends upwardly therefrom such that at least a portion of one light pipe of one of said first and second arrays of light pipes is nested between portions of two light pipes of the other of said first and second array of light pipes.

11. The light pipe assembly of claim 10, wherein said first spacing is larger than said second spacing such that portions of said second array of light pipes are nested between portions of said first array of light pipes.

12. The light pipe assembly of claim 10, wherein a portion of at least one of said second array of light pipes is nested between portions of said first array of light pipes.

13. The light pipe assembly of claim 10, wherein said first spacing is larger than said second spacing such that portions of said second array of light pipes are nested between portions of said first array of light pipes.

14. The light pipe assembly of claim 10, wherein said first and second support bars respectively extend transversely to the light pipes in said first and second arrays of light pipes.

15. The light pipe assembly of claim 10, wherein said first and second arrays of light pipes include respective first and second engagement members extending therefrom for attaching said light pipes to an associated connector.

16. The light pipe assembly of claim 10, wherein said light pipes of said first and arrays of light pipes are spaced apart from each other in a horizontal direction.

17. A connector assembly with means for providing an indication of a state of operation of the connector, comprising:
- a connector housing, the connector housing have a front face, two side faces and a rear face, said connector housing further including two receptacle portions for receiving mating portions of two distinct corresponding opposing members when said opposing members are mated to said connector assembly;
- an array of light pipes formed from a light transmitting material, each of the light pipes having a connecting end and a display end interconnected by body portions ends of said light pipes, the light pipe array having engagement members for engaging the connector housing, said light pipes being arranged in said array such that said light pipe connecting ends are disposed adjacent the side faces of said connector housing and said light pipe body portions and display ends extend away from said front face of said connector housing and are in a disposed in a space between said connector housing receptacle portions;
- said light pipes including:
- a first pair of light pipes which are spaced apart from each other in a first preselected spacing by integral bridging portions that extend transversely to said first pair of light pipes, at least one of the bridging portions including a first engagement member extending therefrom for engaging a first slot disposed in said connector housing; and,
- a second pair of light pipes, the second pair of light pipes being spaced apart from each other in a second preselected spacing by integral bridging portions that extend transversely to said second pair of light pipes, at least one of the bridging portions including a second engagement member extending therefrom for engaging a second slot disposed in said connector housing; and,
- said first preselected spacing being wide enough to accommodate said second pair of light pipes between said first pair of light pipes.

18. A light pipe assembly for providing an indication of a state of operation of an associated connector, comprising:
- a first pair of light pipes formed from a light transmitting material, each of the pipes having an input end and a display end at opposing ends of said pipes, the first pair of pipes being spaced apart from each other in a first preselected spacing by first bridging portions that extend transversely to said pair of pipes, and,
- a second pair of light pipes, also formed from a light transmitting material, each of the second pair of light pipes having a connecting end and a display end at opposing ends of said pipes, said second pair of pipes being spaced apart from each other in a second preselected spacing by second bridging portions that extend transversely to said second pair of pipes, said first preselected spacing being wide enough to accommodate said second pair of light pipes between said first pair of light pipes;
- said light pipes of each of said first and second pairs being interconnected together in respective pairs by respective first and second support members, each of the first and second support members including at least respective first and second engagement members extending therefrom for engaging said associated connector.

19. A light pipe assembly for providing an indication of a state of operation of an associated connector, comprising:
- a first pair of light pipes formed from a light transmitting material, each of the pipes having an input end and a display end at opposing ends of said pipes, the first pair of pipes being spaced apart from each other in a first preselected spacing by bridging portions that extend transversely to said pair of pipes, and,
- a second pair of light pipes, also formed from a light transmitting material, each of the second pair of light pipes having a connecting end and a display end at opposing ends of said pipes, said second pair of pipes being spaced apart from each other in a second preselected spacing by bridging portions that extend transversely to said second pair of pipes, said first preselected spacing being wide enough to accommodate said second pair of light pipes in place between said first pair of light pipes; and,
- wherein said first pipes of said first and second pairs are interconnected together by a first transverse support member that is disposed above said first pipes so that said first pipes depend downwardly therefrom, and said second pipes of said first and second pairs of light pipes are interconnected together by a second transverse support member that is disposed below said second pipes, said first pipes of said first and second pairs fitting between said second pipes of said first and second pairs of light pipes.

20. A light pipe assembly for providing an indication of a state of operation of an associated connector, comprising:
- a first pair of light pipes formed from a light transmitting material, each of the pipes having an input end and a display end at opposing ends of said pipes, the first pair of pipes being joined together and spaced apart from each other in a first preselected spacing by first bridging portions that extend transversely to said pair of pipes, and,
- a second pair of light pipes, also formed from a light transmitting material, each of the second pair of light pipes having a connecting end and a display end at opposing ends of said pipes, said second pair of pipes being joined together and spaced apart from each other in a second preselected spacing by second bridging portions, separate from the first bridging portions, the second bridging portions extending transversely to said second pair of pipes, and,
- wherein said light pipes of each of said first and second pairs are interconnected together in respective pairs by respective first and second support members, each of the first and second support members including at least respective first and second engagement members extending therefrom for engaging said associated connector.

21. A light pipe assembly for providing an indication of a state of operation of an associated connector, comprising:
- a first array of light pipes formed from a light transmitting material, each of the pipes having an input end and a display end at opposing ends of said pipes, the first pair of pipes being joined together and spaced apart from each other in a first preselected spacing by bridging portions that extend transversely to said pair of pipes, and,
- a second pair of light pipes, also formed from a light transmitting material, each of the second pair of light pipes having a connecting end and a display end at opposing ends of said pipes, said second pair of pipes being joined together and spaced apart from each other in a second preselected spacing by bridging portions that extend transversely to said second pair of pipes, said first and second pipes of said first and second pairs including at least one offset bend disposed between said input and display ends thereof and, wherein said first pipes of said first and second pairs are interconnected together by a first transverse support member that is disposed above said first pipes so that said first pipes depend downwardly therefrom, and said second pipes of said first and second pairs of light pipes are interconnected together by a second transverse support member that is disposed below said second pipes, said first preselected spacing being wide enough to accommodate said second pair of light pipes filling in place between said first pair of light pipes.

* * * * *